(12) United States Patent
Hillman Beauchesne et al.

(10) Patent No.: US 12,087,057 B2
(45) Date of Patent: Sep. 10, 2024

(54) SYSTEM AND METHOD FOR DIGITAL FINGERPRINTING OF MEDIA CONTENT

(71) Applicant: 9219-1568 Quebec Inc., Montreal (CA)

(72) Inventors: Olivier Hillman Beauchesne, Montreal (CA); Bertrand Chapleau, Montreal (CA); Jordan Pleet, Montreal (CA); Jose Maria Mateos Perez, Montreal (CA)

(73) Assignee: 9219-1568 QUEBEC INC., Montreal (CA)

( * ) Notice: Subject to any disclaimer, the term of this patent is extended or adjusted under 35 U.S.C. 154(b) by 0 days.

(21) Appl. No.: 18/241,706

(22) Filed: Sep. 1, 2023

(65) Prior Publication Data

US 2023/0410509 A1   Dec. 21, 2023

Related U.S. Application Data

(63) Continuation of application No. 17/817,218, filed on Aug. 3, 2022, now Pat. No. 11,783,583, which is a
(Continued)

(51) Int. Cl.
*G06V 20/40* (2022.01)
*G06V 10/74* (2022.01)
*G06V 40/16* (2022.01)

(52) U.S. Cl.
CPC ............ *G06V 20/46* (2022.01); *G06V 10/761* (2022.01); *G06V 20/49* (2022.01); *G06V 40/169* (2022.01);
(Continued)

(58) Field of Classification Search
None
See application file for complete search history.

(56) References Cited

U.S. PATENT DOCUMENTS

| 8,351,643 B2 | 1/2013 | Radhakrishnan et al. |
| 8,406,462 B2 | 3/2013 | Radhakrishnan et al. |

(Continued)

FOREIGN PATENT DOCUMENTS

| CN | 102314562 A | 1/2012 |
| CN | 103593356 A | 2/2014 |

(Continued)

OTHER PUBLICATIONS

Perceptual Video Hashing for Content Identification and Authentication. Khelifi et al. (Year: 2019).*

(Continued)

*Primary Examiner* — Delomia L Gilliard
(74) *Attorney, Agent, or Firm* — Michele V. Frank; Venable LLP

(57) ABSTRACT

Systems, methods, and computer-readable storage media for digital fingerprinting of media content. The system does this by normalizing and pre-processing the media content into a standard format, then generating fingerprints for image, audio, and/or video aspects of the media. These fingerprints are mathematical vectors generated using one or more techniques, such as perceptual hashes coupled with machine learning. Once the fingerprints for new content is generated, the system can compare those fingerprints to fingerprints of known content to determine if the new content contains prohibited content.

20 Claims, 15 Drawing Sheets

Related U.S. Application Data continuation of application No. 17/576,666, filed on Jan. 14, 2022, now Pat. No. 11,417,099.

(60) Provisional application No. 63/276,883, filed on Nov. 8, 2021.

(52) U.S. Cl.
CPC ........ *G06V 40/172* (2022.01); *G06V 2201/07* (2022.01)

(56) References Cited

U.S. PATENT DOCUMENTS

| | | | |
|---|---|---|---|
| 8,571,255 B2 | 10/2013 | Bauer et al. | |
| 8,700,194 B2 | 4/2014 | Bauer et al. | |
| 8,891,813 B2 | 11/2014 | Radhakrishnan et al. | |
| 8,965,859 B1 * | 2/2015 | Ioffe ........................ | G06F 16/41 707/698 |
| 9,135,674 B1 | 9/2015 | Yagnik et al. | |
| 9,275,427 B1 | 3/2016 | Sharifi | |
| 9,930,406 B2 | 3/2018 | Seo et al. | |
| 10,999,674 B2 | 5/2021 | Lambert et al. | |
| 11,089,360 B2 | 8/2021 | Seo et al. | |
| 11,417,099 B1 | 8/2022 | Hillman Beauchesne et al. | |
| 2006/0083429 A1 | 4/2006 | Joly | |
| 2006/0294371 A1 | 12/2006 | Fanning | |
| 2007/0071330 A1 | 3/2007 | Oostveen et al. | |
| 2007/0174059 A1 | 7/2007 | Rhoads et al. | |
| 2007/0198838 A1 * | 8/2007 | Nonaka ................. | H04L 9/3247 713/176 |
| 2007/0220118 A1 | 9/2007 | Loyer | |
| 2007/0263128 A1 | 11/2007 | Zhang | |
| 2009/0052784 A1 | 2/2009 | Covell et al. | |
| 2009/0304082 A1 | 12/2009 | Radhakrishnan et al. | |
| 2010/0188580 A1 | 7/2010 | Paschalakis et al. | |
| 2011/0035373 A1 | 2/2011 | Berg et al. | |
| 2012/0027295 A1 | 2/2012 | Shao | |
| 2014/0219496 A1 | 8/2014 | Lahr et al. | |
| 2015/0237341 A1 | 8/2015 | Diggins | |
| 2017/0371963 A1 | 12/2017 | Bilobrov | |
| 2018/0288386 A1 | 10/2018 | Lazarow et al. | |
| 2019/0028766 A1 | 1/2019 | Wold et al. | |
| 2019/0123911 A1 * | 4/2019 | Riley .................... | H04L 9/3234 |
| 2019/0213214 A1 | 7/2019 | Schalkwijk et al. | |
| 2019/0251112 A1 | 8/2019 | Stojancic et al. | |
| 2019/0251115 A1 * | 8/2019 | Ramanathan ......... | G06F 16/285 |
| 2019/0287311 A1 | 9/2019 | Bhatnagar et al. | |
| 2019/0311746 A1 | 10/2019 | Shenkler | |
| 2019/0342594 A1 | 11/2019 | Korte et al. | |
| 2021/0144435 A1 | 5/2021 | Seo et al. | |
| 2021/0256058 A1 | 8/2021 | Browarnik et al. | |
| 2021/0319230 A1 | 10/2021 | Schmidt | |
| 2021/0321150 A1 | 10/2021 | Renner et al. | |
| 2022/0215205 A1 | 7/2022 | Swaminathan et al. | |

FOREIGN PATENT DOCUMENTS

| | | |
|---|---|---|
| EP | 1112549 A1 | 7/2001 |
| EP | 2323046 A1 | 5/2011 |

OTHER PUBLICATIONS

Ning, G. et al., (Sep. 2016). Joint Audio-Video Fingerprint Media Retrieval Using Rate-Coverage Optimization. IEEE; (13 pages). https://www.researchgate.net/publication/3078624 [Cited in Parent].

International Search Report and Written Opinion from International Application No. PCT/IB2022/000669 dated Mar. 31, 2023; 13 pages.

Nikolaidis et al., (2006). "Image and Video Fingerprinting for Digital Rights Management of Multimedia Data," International Symposium on Intelligent Signal Processing and Communication Systems; pp. 801-807.

Esmaeili et al., (Mar. 2011). "A Robust and Fast Video Copy Detection System Using Content-Based Fingerprinting," IEEE: Transactions on Information Forensics and Security, vol. 6, No. 1; pp. 213-226.

Liu et al., (2018). "Content-based Video Copy Detection using Binary Object Fingerprints," IEEE; 6 pages.

* cited by examiner

FIG. 9B

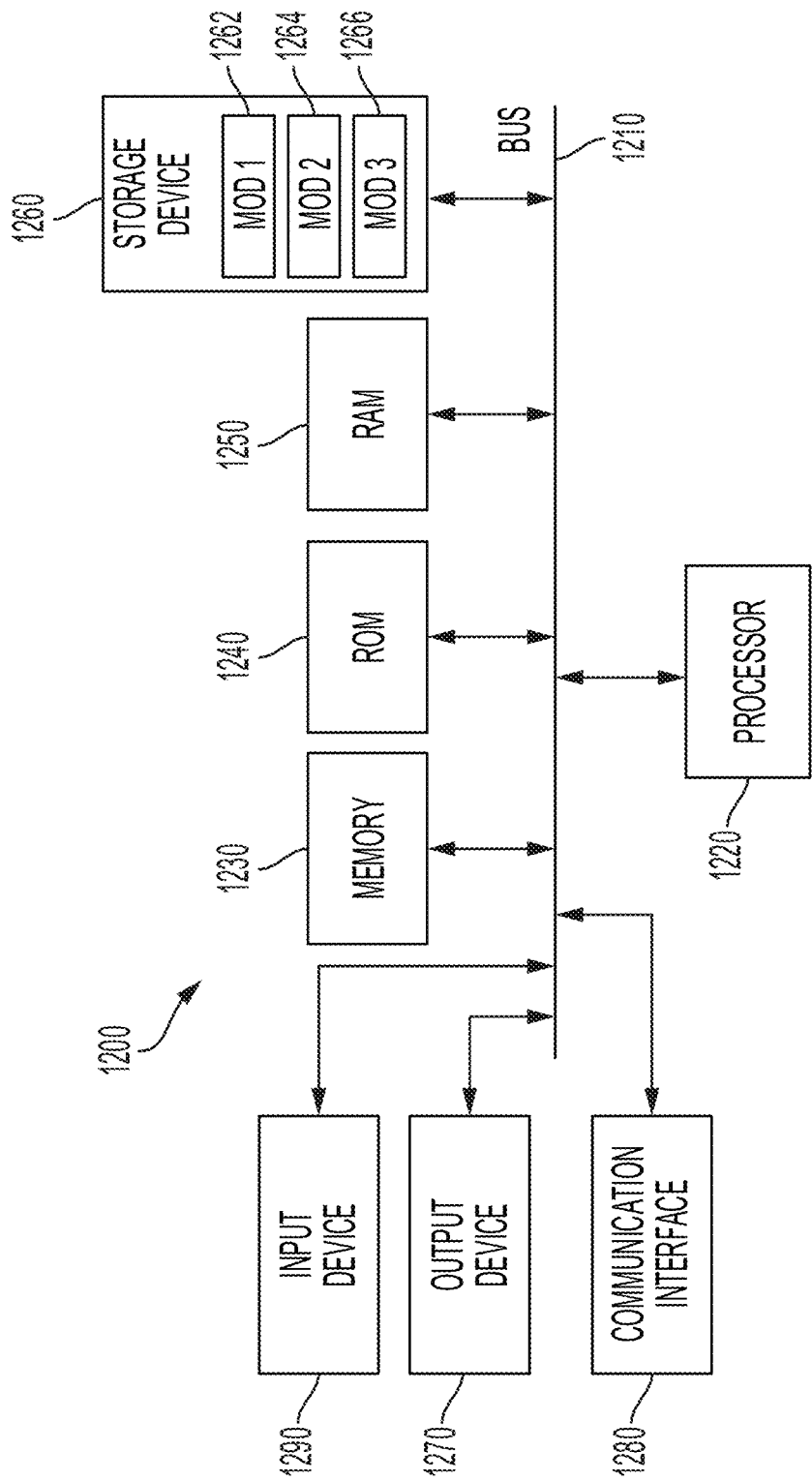

SYSTEM AND METHOD FOR DIGITAL FINGERPRINTING OF MEDIA CONTENT

PRIORITY

The present application is a continuation of U.S. patent application Ser. No. 17/817,218, filed Aug. 3, 2022, which is a continuation of U.S. patent application Ser. No. 17/576,666, filed Jan. 14, 2022, now U.S. Pat. No. 11,417,099, issued Aug. 16, 2022, which claims priority to U.S. Provisional Patent Application No. 63/276,883, filed Nov. 8, 2021, the entire contents of which are incorporated herein by reference in their entireties.

BACKGROUND

1. Technical Field

The present disclosure relates to digital fingerprinting of media content, and more specifically to detection of copyrighted media and/or other prohibited content using a combination of audio and visual fingerprints.

2. Introduction

For hosts of online media platforms, particularly Video Sharing Platforms (VSPs), where users of a website can upload the content for distribution, ensuring that uploaded content complies with rules, laws, and/or regulations is a difficult problem. For many such websites, the amount of uploaded content each minute is impossible for an individual reviewer to review in a month. To check the content for copyright violations or content violations, various forms of automated filtering can be used which flag the content for further review. However, such automated filtering is often imprecise, resulting in too many false positive and/or false negatives, depending on how strict the filtering process is configured. Many content fingerprinting solutions, such as file hashing can be easily evaded by re-encoding, truncation, and/or meta-data changes. In addition, such automated filtering can easily result in excessive computations, because as the number of known pieces of content increase, the number of comparisons needed to ensure new content is not copyrighted and does not contain otherwise prohibited content also increase.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include receiving, at a computer system, a media file comprising video and audio; preprocessing, via at least one processor, the media file, resulting in: a modified copy of the video; a modified copy of the audio; and keyframes within the video; creating, via the at least one processor, a video fingerprint of the modified copy of the video using a perceptual hash algorithm, the video fingerprint comprising first vectors for individual segments of the modified copy of the video; creating, via the at least one processor, an audio fingerprint of the modified copy of the audio, the audio fingerprint comprising second vectors for the individual segments of the modified copy of the video; creating, via the at least one processor, a keyframe fingerprint based on the keyframes; executing, via the at least one processor, a video comparison of the video fingerprint to a previously identified video fingerprint of a comparison media file; executing, via the at least one processor, an audio comparison of the audio fingerprint to a previously identified audio fingerprint of the comparison media file; executing, via the at least one processor, a keyframe comparison of the keyframe fingerprint to a previously identified keyframe fingerprint of the comparison media file; and determining, via the at least one processor, that the media file contains prohibited content based on at least one of the video comparison, the audio comparison, and the keyframe comparison.

A system configured to perform the concepts disclosed herein can include: at least one processor; and a non-transitory computer-readable storage medium storing instructions which, when executed by the at least one processor, cause the at least one processor to perform operations comprising: receiving a media file comprising video and audio; preprocessing the media file, resulting in: a modified copy of the video; a modified copy of the audio; and keyframes within the video; creating a video fingerprint of the modified copy of the video using a perceptual hash algorithm, the video fingerprint comprising first vectors for individual segments of the modified copy of the video; creating an audio fingerprint of the modified copy of the audio, the audio fingerprint comprising second vectors for the individual segments of the modified copy of the video; creating a keyframe fingerprint based on the keyframes; executing a video comparison of the video fingerprint to a previously identified video fingerprint of a comparison media file; executing an audio comparison of the audio fingerprint to a previously identified audio fingerprint of the comparison media file; executing a keyframe comparison of the keyframe fingerprint to a previously identified keyframe fingerprint of the comparison media file; and determining that the media file contains prohibited content based on at least one of the video comparison, the audio comparison, and the keyframe comparison.

A non-transitory computer-readable storage medium configured as disclosed herein can have instructions stored which, when executed by a computing device, cause the computing device to perform operations which include: receiving a media file comprising video and audio; preprocessing the media file, resulting in: a modified copy of the video; a modified copy of the audio; and keyframes within the video; creating a video fingerprint of the modified copy of the video using a perceptual hash algorithm, the video fingerprint comprising first vectors for individual segments of the modified copy of the video; creating an audio fingerprint of the modified copy of the audio, the audio fingerprint comprising second vectors for the individual segments of the modified copy of the video; creating a keyframe fingerprint based on the keyframes; executing a video comparison of the video fingerprint to a previously identified video fingerprint of a comparison media file; executing an audio comparison of the audio fingerprint to a previously identified audio fingerprint of the comparison media file; executing a keyframe comparison of the keyframe fingerprint to a previously identified keyframe fingerprint of the comparison media file; and determining that the media file contains prohibited content based on at least one of the video comparison, the audio comparison, and the keyframe comparison.

BRIEF DESCRIPTION OF THE DRAWINGS

FIG. 9B illustrates a third example user interface showing matching portions;

FIG. 12 illustrates an example computer system.

DETAILED DESCRIPTION

Figure 1:
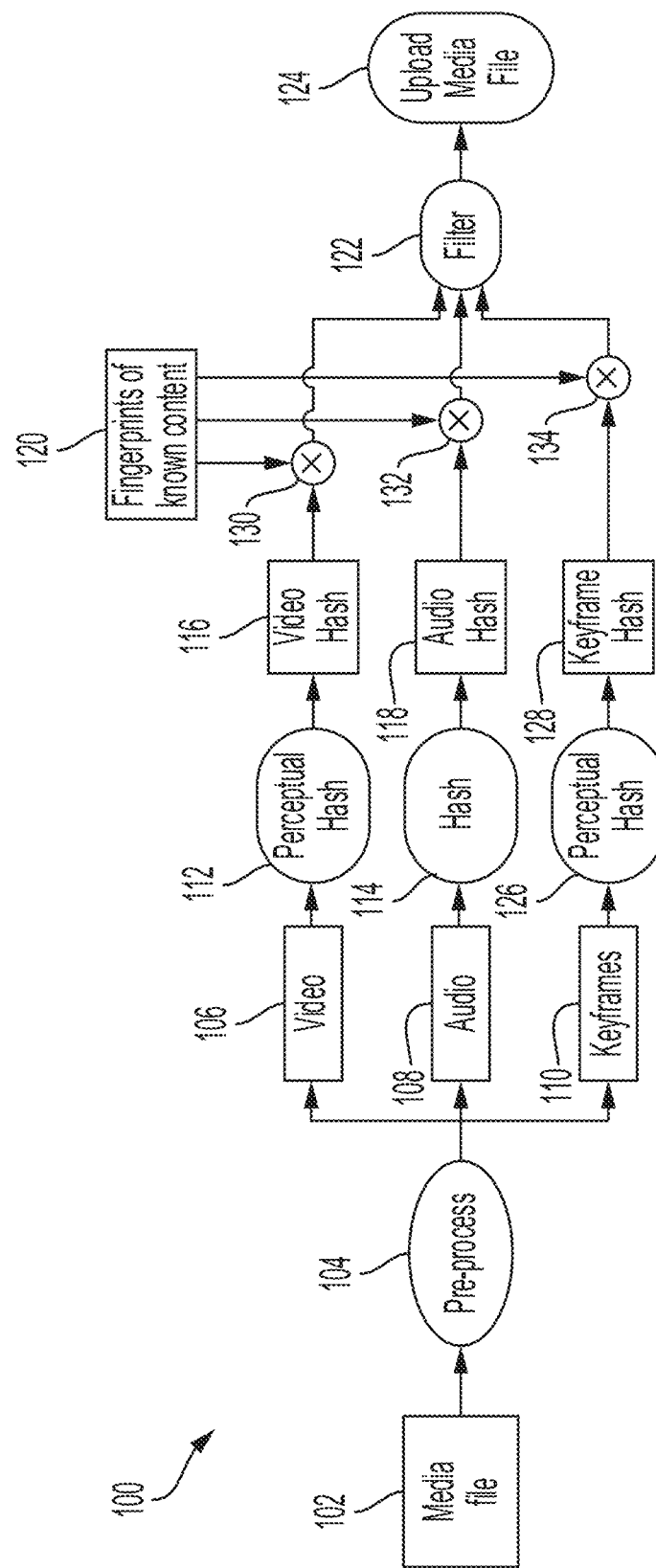
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

One exemplary, non-limiting, practical application to the technical problem noted above is, when media is uploaded to a online platform, to compare "fingerprints" of the uploaded media content to stored fingerprints of known content, where the known content is copyrighted and/or which was previously identified as prohibited content (such as child pornography, non-consensual media, etc.). Prohibited content, as defined herein, can include any content which the owner or uploader of the media file is not legally allowed to share, including copyrighted media, video or images of underage sexual content, video or images which were obtained without consent, etc. The general process for identifying prohibited content can be summarized as: (1) Preprocessing all visual (image and/or video) and audio submissions into common formats (resulting in a modified copy of the media file submission); (2) Fingerprinting the common format video and audio submissions, such that the content is converted into unique, irreversible quantities; (3) If the content is to be protected, store the fingerprints in a database (such as, but not exclusive to, an ANN DB (Approximate Nearest Neighbor Database)), which can be used to quickly find similar elements; and (4) Identifying matching or very similar content within the database(s), optionally performing a second verification of matches, and reporting the matches to a user.

Only media content which does not contain copyrighted or otherwise prohibited material will then be permitted to be stored on the media platform. The fingerprints are (for example, with video content) abstract, non-reversible representations of scenes, segments, clips, and/or sub-portions of the media content. For example, as videos and sounds are a sequence of events (images for videos, waveforms for audio), a sequence of fingerprints are computed for both video and audio portions of media content. During the matching steps, the sequence can then be compared to known fingerprints of previously processed media content. The system can support many fingerprinting engines, resulting in calculating multiple types of fingerprints during the protection or scanning process. This large quantity of fingerprints per item or sub-items of content increases the confidence level and accuracy of the decisions taken by matching engines in the later stages of the scanning process.

Consider the role of the disclosed fingerprinting methods and systems within the content compliance process. First, new content uploads are stored and encoded to different files formats to support many devices (PC (Personal Computer), mobile, etc.). These uploads and subsequent encoded files can be stored locally and can be inaccessible to unauthorized personnel or systems. At this point, the upload/encoding process pushes the file through different gates/systems that can scan the content and report any results prior to review by compliance teams. The fingerprinting methods and systems described herein is one of many gating systems which can be used, alone or in combination with other gating systems, and can provide results to compliance teams who can allow the content to be distributed or can prohibit the content's distribution.

For example, a VSP's encoder can send all uploads, whether images or videos, to the system. Once the system receives the content, the content can be preprocessed to standardize its format before being sent to the different fingerprinting and matching engines within the system. At this point, the VSP encoder waits until the content has been scanned by the system before moving it along the review process. Once the system has scanned the content, it will callback the encoder with a response. For videos, three types of responses are possible:

MATCH: one or more videos has matched the uploaded videos and the system is confident that the match is accurate;

SUSPCIOUS: one or more videos has matched the uploaded videos and the system is unsure if the match is accurate;

NOMATCH: no video matches the uploaded video.

When a MATCH or SUSPICIOUS response is returned, the video is then moved to a separate queue where the suspected match is reviewed by the compliance team. The process for images can be similar, but instead of the three different responses as described above, several distance metrics can be provided by the different engines for the images that are most likely to match the protected catalog. As it is a distance metric, the lower the metric is, the more likely the image in the catalog is a match. If the distance metrics are low enough to trigger a match, the image is moved to a separate queue where the suspected match is reviewed by the compliance team.

The fingerprinting system disclosed herein can be a freestanding component to be integrated by VSPs, and as such can avoid any dependencies. In other words, the system can be completely decoupled from VSPs and thus can be easily integrated by partners with no software or framework dependencies. As further described herein, and unless explicitly described otherwise, a "system" refers to either a standalone fingerprinting system containing one or more fingerprinting engines or a VSP upload and compliance system containing the fingerprinting system containing one or more fingerprinting engines therein.

When content is received by the system, it is first pre-processed and standardized before converting the content into fingerprints. As part of the standardization, if the content contains both audio and video (such as in a movie), the audio and video parts can be separated before becoming standardized. It is noted that in some scenarios and configurations, the content may be visual only (such as images, GIFs, or video without audio) or audio only. Once the content is preprocessed and standardized, parallel processes can ingest and apply transformations to the processed content, creating various fingerprints.

As an example of audio preprocessing, the audio signal can be extracted into a raw WAV (or other audio format) file, and both channels can be merged into a single mono file (if stereo audio is present). All signals below a certain amplitude threshold are considered noise and removed. For example, the audio track can be noise-gated (−90 dB) to remove background interference that would hinder accurate matching. Silent parts of the track can also be removed as the silence itself does not constitute information. The audio sample rate can be standardized to a common sampling rate, where the common sampling rate is predetermined before the preprocessing is initiated. The resulting audio signal can then be downsampled and stored on disk.

The video track goes through a similar preprocessing procedure. For example, all input files can be downsampled to a fixed resolution of R×C (rows×columns) and N frames per second, and this modified file can be stored on disk. This also ensures that very large video files (such as 4K formats) have their size greatly reduced for the next steps in the pipeline. In addition, homogeneous background colors (such as the black bars that appear on vertical videos) are detected and removed. If the background is removed, the modified video is also saved to disk and passed to the next preprocessing steps.

Pre-processing other types of visual content (such as images or GIFs) can also be performed. Images are treated as a sequence of frames: a static image (for example, a JPEG file) is considered to contain only one frame, whereas a GIF animation is considered to have N frames. With images as sequences like videos, all subsequent operations down the pipeline can be generalized.

The preprocessing step for images can include: For every frame in the image, background bars consisting of a single color are found and removed. Every frame is then saved as an individual file (such as a PNG file), and the resulting collection of files is passed forward to the pipeline. Other steps which can be included are: the resolution can be reduced, each image submitted generates derivative images that can be flipped and rotated to increase the likelihood of a match, and/or auto correcting to landscape or portrait.

Once the content is preprocessed, fingerprinting engines (computer processor executable code/algorithms) are available for images, video, and or audio aspects of the content. These distinct engines can create mathematical representations ("fingerprints") of the content using one or more media-specific engines, then compare the fingerprints to known fingerprints stored in a database. The known fingerprints can correspond to copyrighted material and/or protected content. While examples are provided of how images, video, and audio fingerprint engines, it is noted that these engines are exemplary, and the system can include other types of fingerprint engines known to those of skill in the art.

With regard to images, different exemplary types of fingerprinting engines are available to convert an image into a fingerprint that can be compared to the protected content catalog. Any combination of the image fingerprinting engines can be deployed by the system, such that the system may use a single image fingerprinting engine, multiple image fingerprinting engines (in series or in parallel), or no image fingerprinting engines, depending on the specific configuration of the system and needs based on the content under review. The purpose of hashing the image information is to obtain a numerical representation that condenses the content of the image in a way that's non-reversible and searchable in a database. At the same time, hashes (fingerprints) need to be resistant (up to a point) against modifications in the image content, such as zooming, changes in brightness, contrast, color, the addition or removal of watermarks, etc. So called perceptual hashes have these desired properties.

A first exemplary image fingerprinting engine uses a difference hash, or "dHash." The idea behind this hash is that the image is first converted to greyscale, then reduced to an 8×9 grid, in which all the cells (the new pixels) contain the average grey level value of the pixels in the original image that would be included on that image region. This 8×9 grid can be two 8×8 grids: a left one (L) and a right one (R), that overlap in all but one column. The system can then compare the grey level values for each cell in every grid, and note a 1 if L>R (the cell in the left grid has a grey level value greater than the cell in the right grid) or 0 if R>=L. This creates a 64-bit hash based on the L/R comparison of our input image. If the image contained multiple frames (such as within a GIF, or within a video segment), this operation is done for all the frames in the image.

At ingestion time, this 64-bit hash (or hashes) is generated, then stored in the ANN DB.

At query time, the hashes for the frames being queried are matched against the previously stored hashes/fingerprints existing in the ANN DB. Exact matches are not needed, as images can be slightly different, so a sane predetermined threshold (up to N bits of difference) can determine whether there is any match. Also, as an extra protection against image modification, the hashes of the queried images in both mirrored and rotated forms can be queried.

While the first image fingerprinting engine is simple but effective, the system can also use a second image fingerprint engine where a convolutional neural network (CNN) called Deep Perceptual Hasher (DPH) is trained to convert images in such a way that similar images will have similar outputs, helping match visual content even if the content is altered. The input of the DPH model is an image or video frame and the output of the model is an N-dimensional embedding, such as a vector of 128 floats. For speed, a smaller CNN architecture, like MobileNetV2, can be trained on subject-specific images related to the type of content that will be protected.

The training the DPH convolutional neural network uses a triplet loss function where, at each training step, the DPH model outputs the embeddings of 1) a training image, 2) the training image randomly transformed (e.g., cropped, padded, rotated, flipped, slight color changes, etc.), and 3) another image with the same random transformations. The DPH model then learns that the embedding between the training image and its transformation should be closer than the other image. For best results, the other images should be similar to the training images, which can be determined by the perceptual hash described above. This training step is repeated over thousands of images multiple times until the loss score plateaus. Once this point is reached, the DPH convolutional neural network can be considered trained.

To obtain fingerprints/hashes through using the DPH engine, images are simply passed through the DPH model to get embeddings, also known as vector formation. The embeddings of protected images are stored in ANN DB s. Any query image can be embedded using the DPH, and the resulting fingerprint searched against the ANN DB s to find matches below a distance threshold. The distance can, for example, be a Hamming distance, or any other type of distance measurement between the two fingerprints. Additional non-limiting, exemplary distance measurements between fingerprints can include a weighted correlation distance, a quadratic form distance, a Hausdorff distance, etc.

With regard to video fingerprinting, because videos are a sequence of images, the video fingerprinting engines are very similar to the ones used for static images. In a first example, the video file has been downsampled to R frames per second, but if every frame is hashed, there can be too many hashes per file. Therefore, the system can use a rolling window to compute the average of the frames inside a region of S seconds, hash this average frame using the same 8×9 system described above with regard to images, and then moves forward M seconds. M and S are chosen so that there is a certain overlap between the regions. This way, even an hour-long movie yields only a few hundred hashes and the database size is manageable even when there are millions of movies ingested.

If the background bars were detected and removed in the preprocessing stage, the hashes of the original video file (with the bars) can also be computed. The system can also compute the hashes for the mirrored video, and these are used only at query time to establish matches.

At ingestion time, the hashes are added into an ANN DB. Only the direct hashes are used in this operation (not the ones for the mirrored video).

At query time, the direct and mirrored hashes are queried against the ANN DB to obtain the videos that have the most matches. These candidates are confirmed during a second stage to make sure that the matches have a certain temporal coherence (for example, ensuring that matches are not scattered all around the timeline, they don't belong to the same temporal moment, etc). Once noisy candidates have been removed, the filtered matches are returned. If two set of hashes were received (one for the unmodified file, another one for the file with the background removed), two queries are performed, and their results are aggregated so that this operation is transparent for the user.

In some configurtions, the window length S is predetermined, such as five seconds or ten seconds long. In other configurations, the system uses a window length which can vary based on the size of the file being analyzed.

The system can also define overlap parameters, for example in seconds, meaning that each window will overlap the previous by a number of seconds. An average frame is created with all frames inside a window of a predetermined length. A segment fingerprint is generated for each window, and the system moves the window in a way that overlaps with the previous one the configured number of seconds, and continue until there are no frames left to read.

Another example video fingerprinting engine can use a process similar to the "Deep Perceptual Hash" for video files. For efficiency, not every frame of a video can be embedded with the DPH model. Select frames, called "keyframes", are extracted from videos and embedded with the DPH model. The contrast in each frame, measured as the root mean square error of the greyscale frame, can be computed and the frames with the most distinct contrast within sliding windows of S seconds can be selected as keyframes. For example, if the sliding window is five seconds long, the system can calculate the amount of contrast of each frame, then select the frame within that window which has the highest amount of contrast as a keyframe. The system can then move the sliding window and continue identifying keyframes.

The embeddings of the keyframes can be either 1) stored in an ANN DB for protection or 2) queried against the ANN DB to find matches. If keyframe matches after querying clearly belong to a protected video, the video match is reported. If matches are less clear with no standout video, the matched videos can be considered candidates and sent to an additional match confirmation step using time-series alignments (see MASS description below). In some configurations, because the same DPH model is used for images and videos, the embeddings from one can be searched against protected embeddings of the other, if requested.

While the example of identifying keyframes based on greyscale contrast is provided above, identifying the keyframes which will be analyzed by the DPH algorithm can be accomplished in any manner known to those of skill in the art. Additional exemplary ways in which the keyframes can be identified include: (1) Scoring each frame based on the difference between the frame from the previous frame and the color variation within the frame. For example, the system can take the frames within a segment/specific subportion of the video and group those frames into buckets of time T (e.g., T=5 seconds) and, within each bucket, take N top scoring frames as key frames. (2) Processing the frames of the videos to determine when a predetermined amount of contrast between frames has been detected. For example, from a first keyframe within a video, the system can compare each subsequent frame until an amount of contrast between the first keyframe and a later frame have the predetermined amount of contrast. Once the predetermined amount of contrast is found within a subsequent frame, that subsequent frame is identified as the next keyframe, and the process can continue throughout the remainder of the video. In other configurations, the contrast can be determined based on time, such that contrast measurements are taken every period of time t until a predetermined amount of contrast is found. For example, the system can measure contrast every second, until the threshold amount of contrast is detected. (3) Within video compression, there are I-frames (Intra-coded picture) which contain a complete image, like a JPG or BMP image file; P-frames (Predicted picture) which hold only the changes in the image from the previous frame; and B-frames (Bidirectional predicted picture), which uses differences between the current frame and both the preceding and following frames to specify its content. In some configurations, the system can identify the I-frames as the keyframes.

A third example of video fingerprinting again relies on contrast. As discussed above, the frames of the videos to determine when a predetermined amount of contrast between frames has been detected, and identifying those points. However, in this example the system generates a fingerprint based on the points in time where sufficient contrast is detected. The fingerprint generated allows the system to compare temporal changes in contrast between the videos, with the resulting fingerprint again being a list of values associated with a given segment, where the respective values indicate when those points of contrast are detected.

Another visual fingerprint which can be generated are facial fingerprints (also known as face embeddings) that are unique per person and irreversible. Faces can be detected in images and video frames using a Multi-Task Cascaded Convolutional Neural Network (MTCNN). Because faces need to be clear, face detection is run on the original content file. From the detection, facial landmarks can be used to calculate an angle score to determine if the face is positioned more frontal or side viewed. The detected face is cropped and passed through several embedding models and an expression model. The embedding models are each trained on a different dataset of faces and each output an embedding unique to the person, usually a 512 float vector. The expression model is trained on faces with different facial gestures (e.g., happy, surprised, sad, angry) and outputs the probability of each of the gestures for a given face. If, for example, there are eight gestures within the model, the output would be eight different probabilities.

Faces are detected in images and passed through the embedding and expression models. For protected content, the face embeddings, expression probabilities, and angle scores are stored (no actual face crops are kept). The protected face embeddings are preferably stored in their corresponding ANN DBs, though other types of databases may be used. At query, faces are detected in an image, embeddings extracted, and the embeddings are searched in the protected ANN DBs. Those faces found within a distance threshold are considered matches. As a second verification, matching faces need to also have similar expressions and angle scores.

Face matching in videos is slightly different than images because there can be many frames in a video with faces. Frames of a video are extracted every N seconds and the face detection, embedding, and expression models are run on each frame. For protected content, there are too many faces to store all embeddings and filtering is required. Similar faces can be clustered based on a similarity threshold determined for each embedding model and then, in each cluster, the best face can be selected based on a "matchability" score. This matchability score predicts how well a face would match its mirrored self and is important in keeping only faces that can be accurately matched. The data associated with the best faces is then stored, with the embeddings kept in corresponding ANN DBs (no actual face crops are kept).

At query, more faces in the video can be kept than at ingestion and each can be searched in the ANN DBs. Like images, faces found within a distance threshold are considered matches and these matches would need to have similar expression and angle scores to pass a secondary verification. Since the same face models are used on images and videos, the embeddings from one can be searched against protected embeddings of the other.

Once the video fingerprint (in the form of a list, or array, of image fingerprints corresponding to segments/sub-portions/keyframes of the video) is generated, the system can compare the video fingerprint to known video fingerprints stored in a database.

With regard to computing audio fingerprints, computing audio fingerprints can be more complex than videos or images as audio content is a sequence of very brief values that correspond to change in air pressure, and even small imperceptible changes can modify significantly these values. To work around these limitations, the system, during pre-processing, can remove noise above and/or below a certain volume using a noise-gate. The pre-processing can also remove very high and very low frequencies. A Fast-Fourier Transform (FFT) can be applied to extract the spectrogram of the audio content. Accordingly, the basic steps for the audio fingerprinting algorithm can be:

(1) Compute the spectrogram for the audio signal.
(2) Find the spectral peaks of the highest amplitude, separated by a certain distance. The amplitude filtering can be done dynamically, based on the overall audio level in the file, to avoid generating too few hashes when the file is mostly silent, or too many when there is a lot of sound activity. Thresholds of sound activity (to determine the overall audio level) can be predetermined prior to beginning the pre-processing process.

The system can use, for example, a peak finding algorithm to extract amplitude peaks, and the location of those peaks can serve as input to a hash function, the output of which is the audio fingerprint (a hash function is a one-way mathematical function that converts an array of bytes into a small unique identifier).

Unlike the perceptual hashing function used in image and/or video analysis, the audio hash/fingerprint does not provide for a level of similarity between outputs, meaning it can only be used to search for an exact match. To counter this issue, two aspects can be used. First, consistently pre-processing the audio in a predetermined way (that is, using consistent noise-gates, filtering of frequencies, etc.) ensure that the audio being analyzed is analyzed in the same manner as previously identified audio. Second, the system analyzes specific segments/sub-portions of an audio track, with a predetermined length. The audio matching would not work if a hash output of a five second audio clip is compared to that of a three second clip. To accommodate for this, the system can utilize a predetermined set duration of audio content. If necessary, the system can adjust audio encoding during the pre-processing to ensure that the audio content meets the required formatting standards.

The result of the audio fingerprinting is an audio fingerprint made up of a list, or array, of hashed audio fingerprints for sub-portions/segments of the overall audio track.

Following the pre-processing of audio steps described above, the audio fingerprint can be created by generating pairs of spectral peaks. A peak is defined by its time and frequency positions, (t, f). Two peaks, P1, P2, where P2 happens temporarily later than P1, are defined by (t1, f1), (t2, f2). A hash (aka fingerprint) is defined by (f1, f2, t2-t1). The system can also store the t1 as the time when the fingerprint appears on file. In order to further simplify this, the initial triplet (f1, f2, t2-t1) can be encoded as a single integer.

At ingestion time, the fingerprints are stored in a database, preferably a key-value one, though other options are possible. No ANN DB is required here, as exact matches are needed.

At query time, the fingerprints for the input audio are queried against the DB and the number of matches are counted. Content/movies with enough matches are considered candidates and they are the input to the second stage of the query algorithm. This second stage checks if a candidate is valid by ensuring the matches have temporal coherence and form continuous sequences. Once the right candidates have been validated the algorithm returns them as a list of potential prohibited content to a user, or none if no matching movie is found.

In some configurations, an alternative audio fingerprinting method can be used, resulting in audio quad hashes, which is more robust against audio modifications. In such configurations, a spectrogram is computed from the preprocessed audio signal and the points of maximum amplitude are selected. The peaks are then selected in groups of four, with the condition that two of them must be in opposite corners of a rectangle (A—lower left; B—upper right) and another two placed inside (C, D). The (x, y) coordinates for point A are set as (0, 0), B are set as (1, 1), and the C and D coordinates are normalized based on A and B to make C' and D'. This way, C and D (x, y) values will be strictly contained in the range (0, 1). These four data points (x_C', y_C', x_D', y_D') form one audio quad hash.

Two sets of audio quad hashes are generated for every file: one small (the 'reference' hashes), with a maximum of R hashes per second, and a larger one (the 'query' hashes) with a maximum of Q hashes per second (Q >>R). Also, the parameters that control how the spectrogram peaks are selected can vary slightly between the reference hashes and the query hashes. The idea behind this is that the small difference between both hash sets makes this method robust against audio modifications.

At ingestion time, the reference hashes are added to an ANN DB. At query time we run two sequential operations: (1) Run an ANN query with the reference DB (containing the reference hashes of all the clips that should be flagged) with the reference hashes of the input movie, giving a list of potential candidates. (2) Then run a confirmation algorithm for each selected candidate using the reference hashes from the candidates and a sample of the query hashes of the input movie. Such confirmation can be performed by any appropriate comparison algorithm.

Once the image, video and/or audio tracks for a piece of content have been processed and fingerprinted by the processes described above, their fingerprints are stored within the system's databases. At this point, the content can be discarded and removed from the system's infrastructure. However, the system then uses matching engines to compare the fingerprints between the protected catalogs (copyrighted material and/or otherwise prohibited content) and the newly uploaded content.

Contrary to classical hashing functions where a small change in the input will result to a large change to the resulting hash value, perceptual hashing will only slightly change if the input slightly changes. This allows the video/image fingerprints to determine if an image is within a certain degree of similarity to a known video/image fingerprint by considering perceptual hashes as high-dimensionality vectors corresponding to the image or segments of the video. If the vectors are at short distance to each other, they are likely to describe similar content. Thus, for every query, a fast nearest-neighbor database is used to find the closest matches for a given target image/video fingerprint. A similar process can be used for audio tracks, where many candidates for a match are identified, and then further processed and compared to rank most likely candidates for a match.

Whenever a query is executed to the system, the content is downloaded, preprocessed, fingerprinted and queried against databases containing the protected catalog. The most likely fingerprints can be grouped by content (video, image, or audio), and an overlap can be calculated between the fingerprints results and the query, preferably in seconds of overlap though other metrics are possible. For example, based on the overlap of video and audio fingerprints, the system can calculate a 300 seconds (five minutes) of overlap between the two pieces of content. These metrics and overlaps can be converted into a summary response, where all matching content is ranked according to the amount of time (seconds) of overlap. In other configurations, the ranking could be based on percentages of similarity or other similarity metrics. In other words, if a video is uploaded and matches several protected videos, the videos with the longest matching lengths (continuous or not) can be returned in descending order to the integrator. In some configurations, this list can be presented via a User Interface (UI) to a user, who can review the comparison between the original content and the matching content and make a determination if the new content should be added to the database and available for distribution. In other configurations, any content having a level of similarity above a threshold amount (such as fifty percent) could be automatically removed.

If a new piece of content is detected (regardless of if it corresponds to prohibited content), the fingerprint can be automatically added to the system catalog of content (note: the content is not saved to the system, only the fingerprint). If the new piece of content is determined to correspond to known prohibited content (e.g., contains copyrighted material, adult content, non-consensual content, etc.), not only is the fingerprint added to the system catalog, but all previous queries matching this new content will get notified and/or removed. For example, if a video was uploaded several weeks ago to a VSP or a social media platform partner, and a similar video is protected some weeks after, the original upload/query will be notified by the system. This functionality is implemented via a callback to the system integrator.

In some configurations, when content appears to be prohibited content based on video fingerprint similarity, the system can create an additional confirmation using time-series alignments on the contrast signal created for selecting keyframes. This contrast signal, can be an irreversible 1-dimensional time-series of the videos. A given time-series can be compared to candidate time-series with MASS (Mueen's algorithm for similarity search) and DTW (dynamic time warping). MASS aligns two time-series by converting the time-series into the frequency domain and calculating the Euclidean distance between the frequencies. DTW finds the best way to map one time-series to another. MASS and DTW each yield distance measurements that are used to determine if candidates match. Specifically, MASS and DTW align smaller chunks of a given queried time-series to candidate time-series and then determine if the alignments are 1) within a distance threshold and 2) chunks form a streak of alignments. Varying the chunk sizes allows for extra layers of confirmation that the time-series properly align. In other words, the MASS and DTW algorithms can calculate how geometrically similar a given segment of audio or video is to a known segment, producing all of the distances from the query to the subsequences of a long time series. However, such alignments are computationally expensive and cannot be run against every protected video, just the candidate subset.

Because of the computational cost in executing MASS, if MASS is executed, an example of the system flow could be: (1) receive content; (2) separate video and audio content; (3) preprocess the video and audio content; (4) generate fingerprints for the preprocessed video and audio content; (5) determine that the video or audio exceeds a threshold level of similarity to known prohibited content; (6) based on the threshold being exceeded, initiate a MASS algorithm execution on the video or audio; and (7) receive the MASS distance results. The MASS can be presented with the other similarity results, where when a predetermined MASS distance is calculated for a given segment that segment is considered to not match.

In one example, time-series alignments (MASS and/or DTW) are run on the contrast signals of video match candidates. However, the same alignment methods can be run on the mono audio signal to confirm audio matches.

Once fingerprints are generated, the system can seek to identify matches to previously stored fingerprints. In the case of images or GIFs, all matching algorithms (basic hashes, DPH, face detection) can run in parallel and the results from all of them can be used to determine if a match is found.

The matching logic for movies (or other content containing both video and audio data) is a bit more complex. On one hand, a match from the video frames and a match from the audio signal are desirable. Matches that contain only audio or video information might be correct, but may require further confirmation to reduce the number of matches that must be reviewed manually. Also, MASS and DTW are computationally expensive and cannot be run on every single video in the DB. One possible approach for these issues is: (1) Run the basic video hash, basic audio hashes, audio quads, and keyframe queries in parallel; (2) If the basic video hashes and one of the basic audio hashes or audio quads agree on the same movie, then it would be considered a match. If there are no matches at all, and the keyframes also yield low match counts, the movie is declared clear. If there is only a match for the video signal, or only a match for the audio signal, or neither of them but the DPH keyframes return high match counts, the candidates are sent to MASS and DTW time-series alignment for confirmation. If both the MASS output and the DTW output align, a match is declared. Otherwise, the file is suspicious and must be manually reviewed.

Because the video and audio fingerprints generated, as described above, can be lists or arrays, of fingerprints for segments or sub-portions, identifying matches for a single segment's fingerprints can result in false positives. To improve the matching, the system can look for a continuous streak of matches of those segment fingerprints. For example, if a series of segments of a video fingerprint respectfully had "A", "B", "C", and "D" as segment fingerprints, resulting in a fingerprint of ABCD, the system can be looking for continuous streak of either the entirety of the fingerprint (ABCD) (which could be thwarted by eliminating or replacing a single segment fingerprint), and/or a portion of the fingerprint (e.g., ABC or BCD) (which would be more difficult to thwart). This also ensures that the videos are matched even if additional content were added before or after a particular segment, with the prohibited content still being discoverable.

Having generally described the system, the disclosure now turns to the examples illustrated by the figures. FIG. 1 illustrates an example system 100 embodiment. As illustrated, a media file 102 is uploaded to the system 100, and the media file is pre-processed 104. If, for example, the media file is a movie containing both audio and video components, the pre-processing can include, for the audio, filtering the audio through a noise gate, removing various high and/or low frequencies, ensuring that the encoding matches a common/desired format, etc. Examples of video pre-processing can include removing bars from the video, removing color/changing it to a greyscale, changing the encoding to a common/desired format, etc. The system 100 then executes, on the pre-processed video 106, a perceptual hash 112, resulting in a video hash 116, which is the video fingerprint. The system 100 also executes, on the pre-processed audio 108, a hash 114, resulting in an audio hash 118, which is the audio fingerprint. In this example, the system 100 has also identified keyframes 110 from within the pre-processed video, on which the system executes a perceptual hash 126 (such as the DPH embedding), resulting in a keyframe hash 128, which is a keyframe fingerprint.

The system 100 then respectfully compares 130, 132, 134 the video hash 116, the audio hash 118, and the keyframe hash 128 to fingerprints of known content 120. In some configurations, these comparisons 130, 132, 134 can occur simultaneously, whereas in other configurations the comparisons 130, 132, 134 can occur sequentially. For example, the known (audio) fingerprints 120 can be compared to the newly generated audio fingerprint 118 at the same time as the known (video) fingerprints 120 are compared to the newly generated video fingerprint 116. Alternatively, the known (keyframe) fingerprints 120 may not be compared to the newly generated keyframe fingerprint 128 until after the comparison 130 of known (video) fingerprints 120 to the newly generated video fingerprint 116 is complete. In some configurations this sequential process of fingerprint comparisons can be dependent on a threshold level of similarity being determined by a first fingerprint comparison. For example, the keyframe comparison 134 may not occur unless the video comparison 130 and/or the audio comparison 132 is first completed and indicates that potentially prohibited content has been detected.

Once the comparisons 130, 132, 134 are complete, the system 100 can filter 122 the content based on the comparisons 130, 132, 134. If, for example, the comparisons 130, 132, 134 indicate that the newly presented media file 102 is 100% similar to a known, copyrighted file, the system can immediately purge the file and/or provide a notification to the user attempting to upload the file that uploading copyrighted material which they do not own is prohibited (and is therefore prohibited content). If the comparisons 130, 132, 134 indicate that there is a possibility that the media file 102 contains other prohibited content, such as underage sexual content, but the comparisons 130, 132, 134 are not completely certain, the filter 122 can request human review of the content. If the comparisons 130, 132, 134 indicate that the content is new, the system can save the fingerprints 116, 118, 128 to a database, where they can be used when vetting future media files. Once the comparisons 130, 132, 134 are complete, and the filtering process 122 has not identified the content as prohibited for copyright or content reasons, the system 100 can provide an indication 124 to a VSP that the content 102 ready for upload or, if the system 100 is so configured, proceed to upload the content 124.

Figure 2:
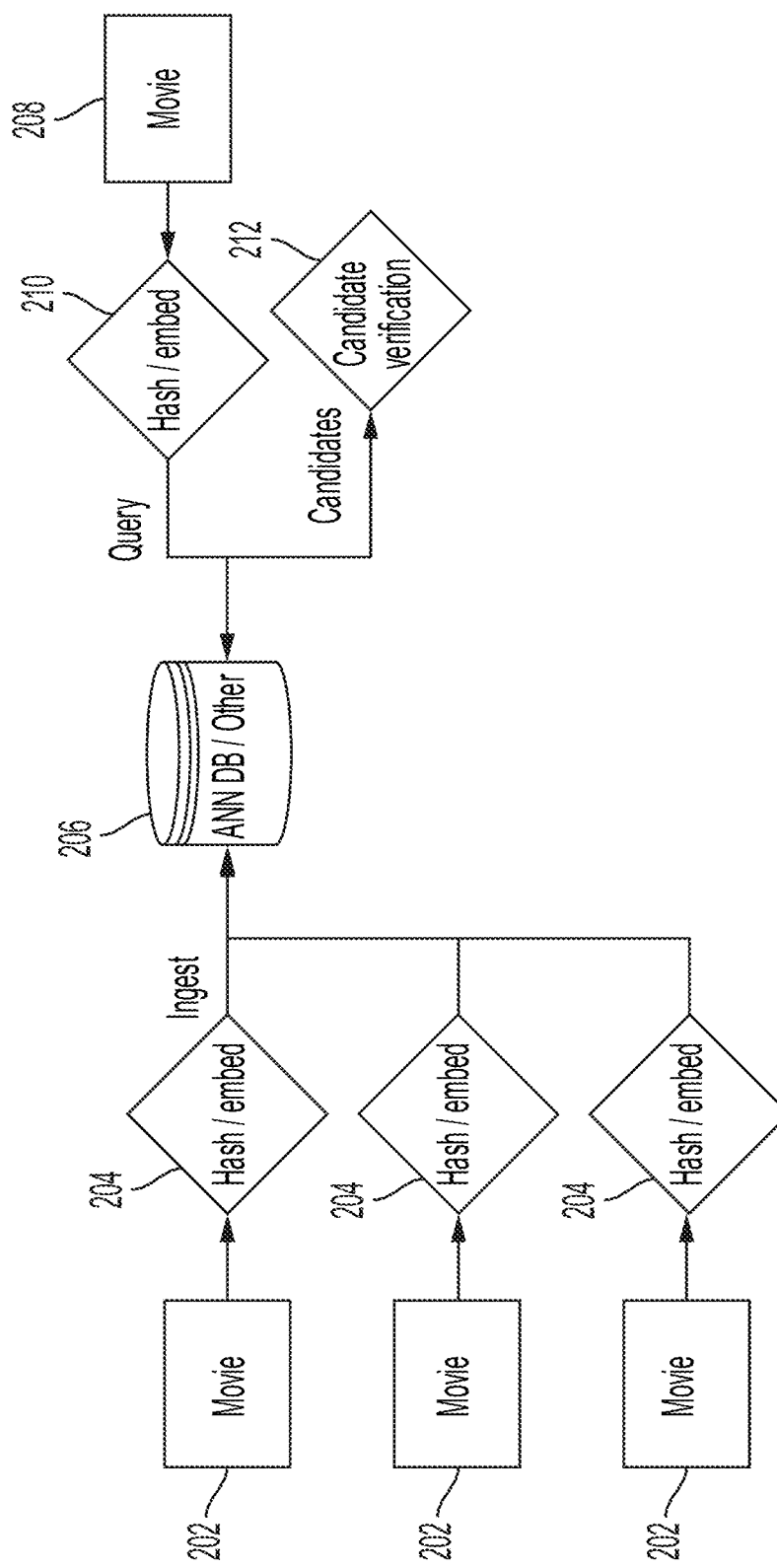
FIG. 2 illustrates an example of comparing known fingerprints to a new fingerprint.

FIG. 2 illustrates an example of comparing known fingerprints to a new fingerprint. As illustrated, a movie 208 is being compared to previously registered/fingerprinted movies 202. Each of the previously registered movies 202 has been hashed/fingerprinted/converted into an embedding (as described above, a mathematical vector), and those fingerprints are stored in a ANN DB 206, referred to as a ANN DB.

Upon receiving the new movie 208, the system generates a hash/embedding/fingerprint 210 for the new movie, and submits the fingerprint 210 as a query to the ANN DB 206. The fingerprint 210 is compared to the fingerprints 204 of the previously known movies 202 and content. If the comparison reveals no clear match, the new movie 208 can proceed to candidate verification 212, where additional information about the new movie 208 may be required. In addition, unless the new movie 208 fingerprint 210 is an exact match to a previously known fingerprint 204 stored in the ANN DB 206, the new fingerprint 210 can be stored in the ANN DB 206 for comparison against future content uploads.

Figure 3:
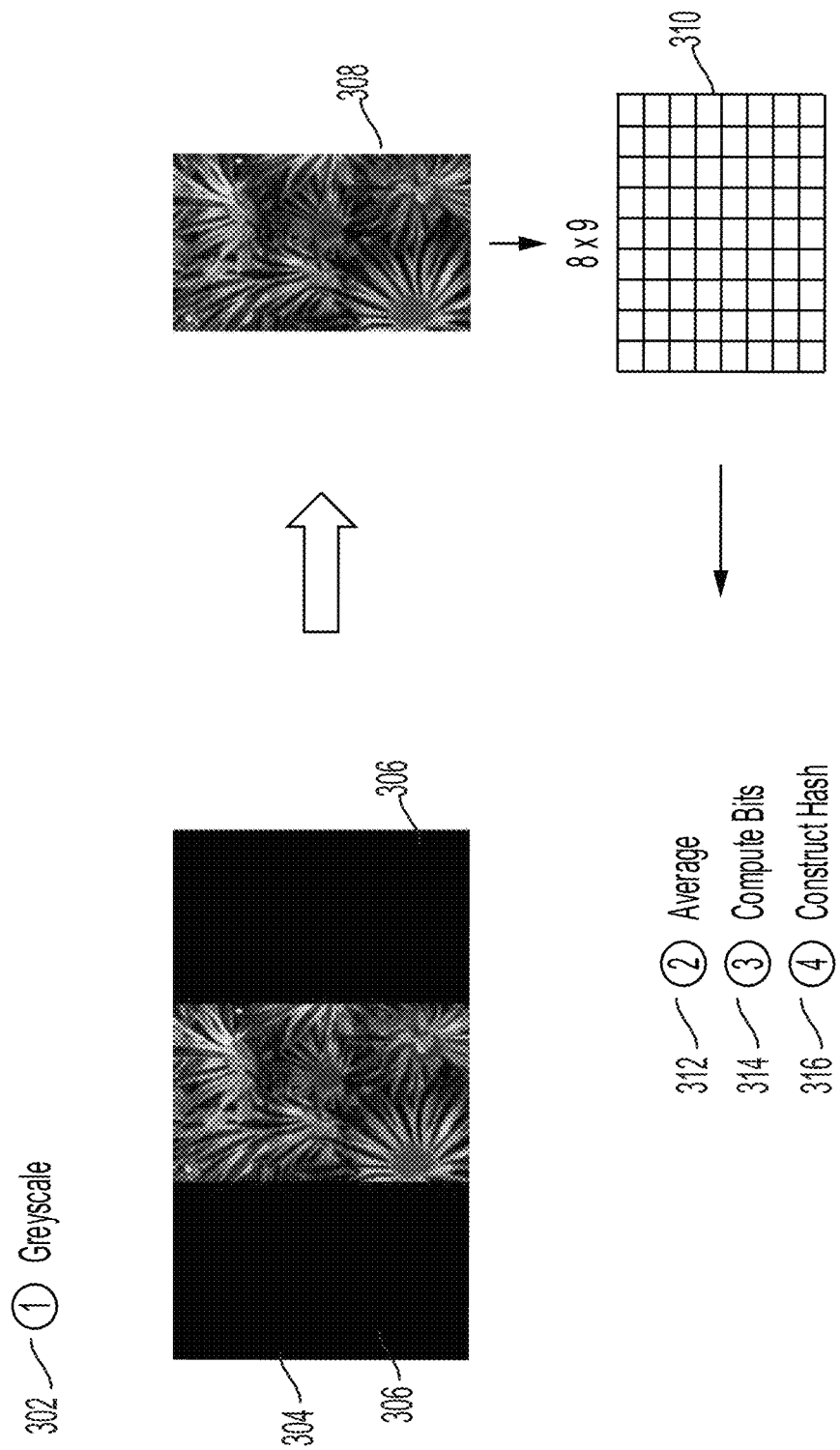
FIG. 3 illustrates an example of preprocessing video and creating a video fingerprint.

FIG. 3 illustrates an example of preprocessing video and creating a video fingerprint. In some configurations, the order or inclusion of various steps can be modified. The same process, or a slightly modified process, can also be applied to individual images where applicable.

When the system receives video content 304, it can be normalized to a reduced framerate and resolution. This normalization can be converting the video content 304 to greyscale 302. This sampling of the content before generating the fingerprint ensures consistency between content items. The system then finds the video length and identifies a portion within the video that has a bar/block of contiguous color 306 (it does not always need to be black, as illustrated). The bars also do not necessarily need to be on the horizontal sides of the image content, but can also be located vertically (on the top or bottom) of the content, on only one side of the content (just the top, bottom, left, or right), or any combination thereof. The system identifies the corresponding coordinates of the block and crops out the block for the respective frames in which the block was present, resulting in the picture/content without the bars 308.

The remaining content is then divided into a grid 310. As illustrated, the grid is 8×9, though in other configurations a different number of cells is possible. With respect to the number of cells, consistency between fingerprinting instances is critical to ensure a proper match, such that if the system is going to use 8×9 grids for video content, all video content needs to be evaluated using 8×9 grids.

As described above, each cell within the 8×9 grid contains the average grey level value of the pixels in the original image 308 that would be included on that image region. This 8×9 grid 310 can be two 8×8 grids: a left one (L) and a right one (R), that overlap in all but one column. The system can then compare the grey level values for each cell in every grid, and note a 1 if L>R (the cell in the left grid has a grey level value greater than the cell in the right grid) or 0 if R>=L. This creates a 64-bit hash based on the L/R comparison of our input image. If the image contained multiple frames (such as within a GIF (Graphics Interchange Format), or within a video segment), this operation is done for all the frames in the image.

At ingestion time, this 64-bit hash (or hashes) is generated, then stored in the ANN DB. As an example, the first value of the fingerprint would correspond to the top left cell of the 8×8 comparison 8×8 grid [1,1], the second would be the cell immediately to the right [1,2], the third would be to the right of that [1,3] . . . the ninth would be the first cell on the second row [2, 1], etc. This would eventually result in a 64 bit long number (a float) which would constitute the fingerprint for this image, or the averaged frames within a video segment. It is noted that in other configurations, the manner in which the fingerprint is formed from the cells, or the number of bits within the fingerprint, can vary while still being within the scope of this disclosure.

Figure 4:
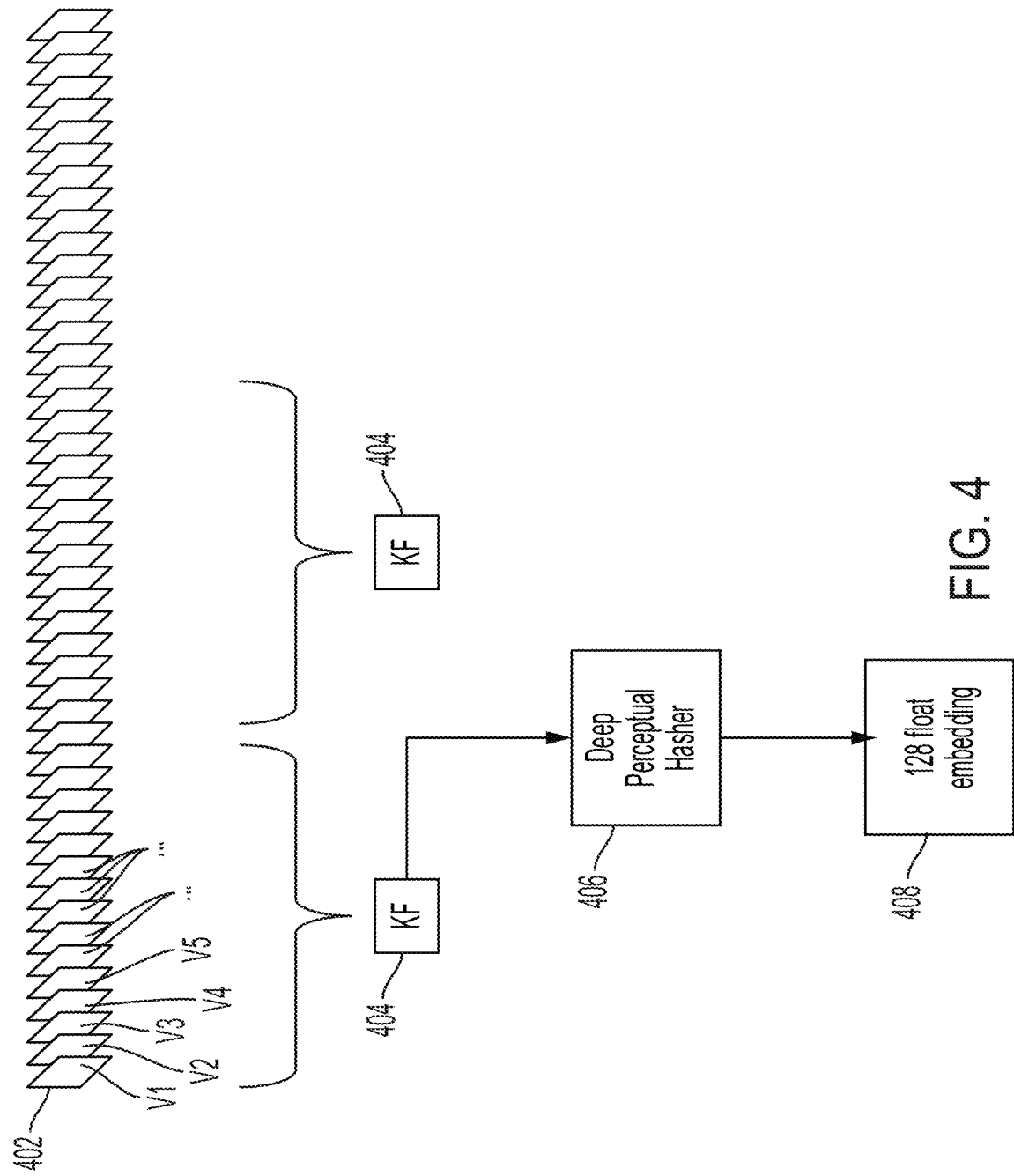
FIG. 4 illustrates an example of creating a keyframe fingerprint.

FIG. 4 illustrates an example of creating a keyframe fingerprint. In this example, a video has a series of frames 402. The system can identify special frames (keyframes 404) from the series of frames 402 and compress the keyframes 404 using deep machine learning. The system can, as illustrated, extract the keyframes 404, then use a Deep Perceptual Hash 406 algorithm as described above to create a 128 bit float embedding (fingerprint) 408.

In some configurations, the keyframes 404 can be extracted by the system: (1) Scoring each frame based on the difference between the frame from the previous frame and the color variation within the frame; and (2) Grouping the frames into buckets of time T (e.g., a window of T=5 seconds) and, within each bucket, take N top scoring frames as key frames (e.g., using N=1 for a single keyframe 404). Once the keyframes 404 are extracted, in some configurations the system can further compress the key frames 404 into a smaller embeddings (such as 64 bit floats in the case of a 128 bit embedding 408).

Figure 5:
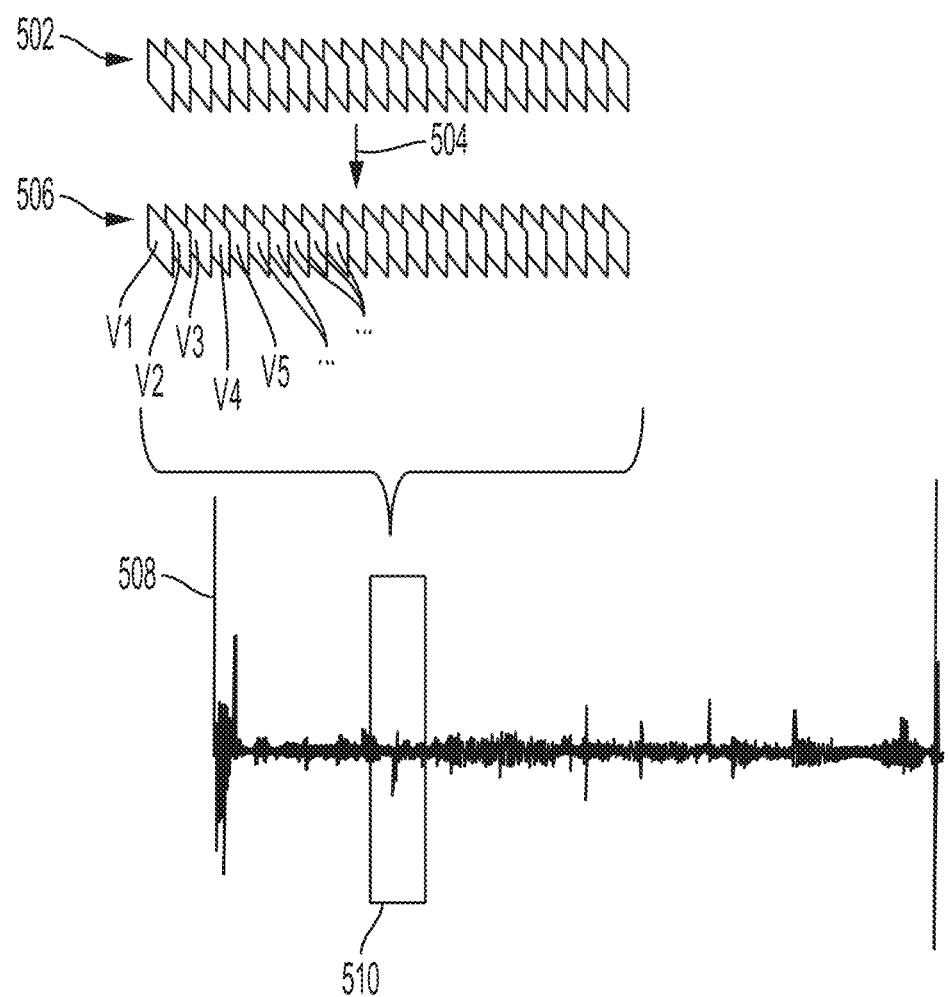
FIG. 5 illustrates an example of preprocessing a segment of a video.

FIG. 5 illustrates an example of preprocessing a segment 510 of a video 508. As illustrated, a series of frames 502 within the segment 510 are received, and the system can normalize the frames before doing the keyframe identifications discussed with FIG. 4. Once the frames are normalized for size, color (converted to a greyscale, etc.), the system can calculate 504 a greyscale contrast between the frames 502, resulting in contrast differences 506 for the frames. The contrast differences 506 can be used to calculate the fingerprint for the segment 510, as described above.

Figure 6A:
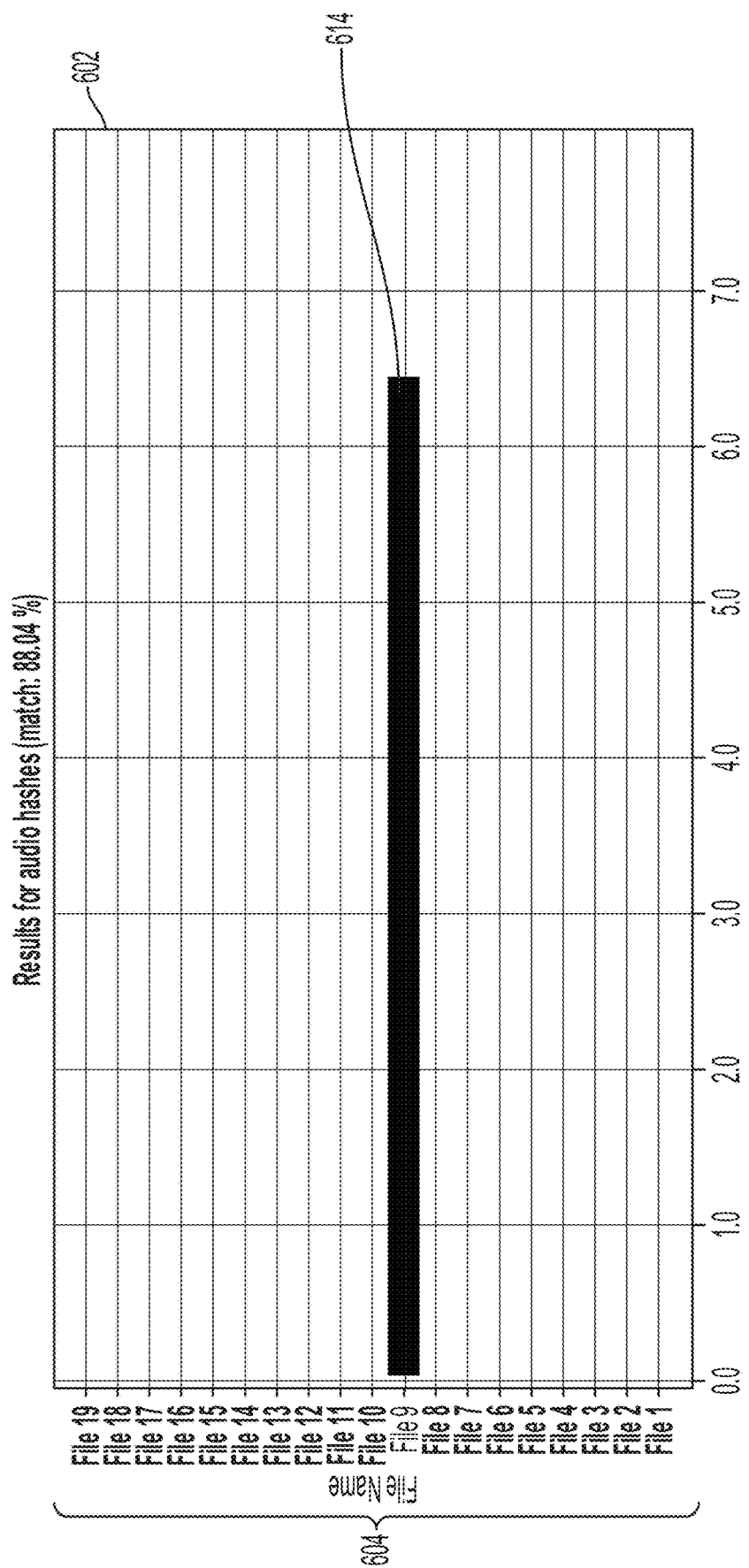
FIG. 6A illustrates an example of audio fingerprint comparisons.

FIG. 6A illustrates an example of audio fingerprint comparisons 602. This is, for example, part of a User Interface (UI) which a user can use to view how content being evaluated by the system compares to multiple other files 604. In this example, the audio fingerprint has an 88.04% similarity to "File 9," illustrated with the black line 614 on the "File 9" row. No notable similarities to other compared files are illustrated. The user can use that information to determine if the content under evaluation contains prohibited content. In some configurations, where the similarity is not as exact, the user interface can use different shades of a color to indicate a level of similarity of a particular section.

Figure 6B:
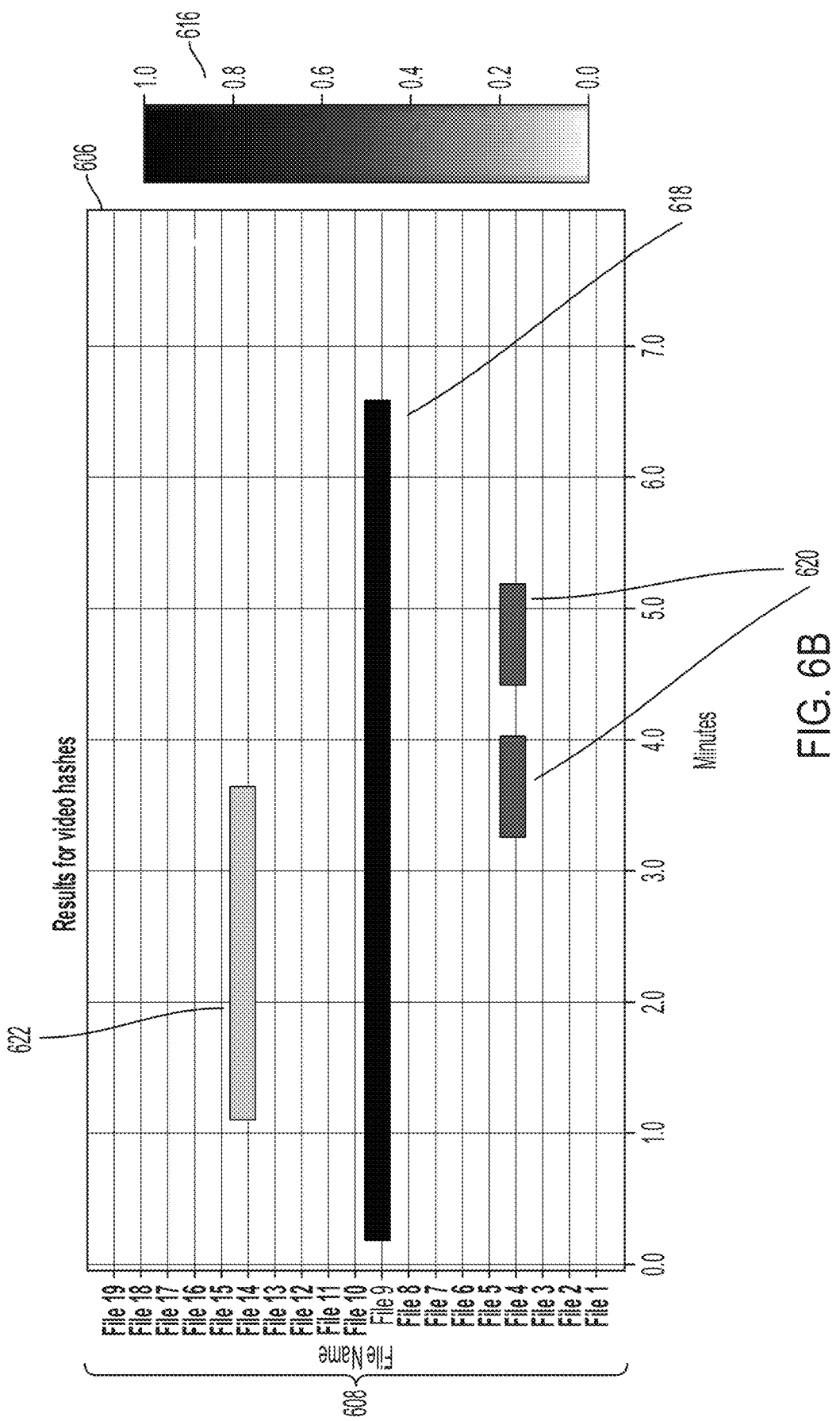
FIG. 6B illustrates an example of video fingerprint comparisons.

For example, FIG. 6B illustrates an example of video fingerprint comparisons 606. Like FIG. 6A, this can be part of a UI used during the content evaluation process. In this example, there is a bar on the right side 616 showing that a level of similarity between two pieces of content can be illustrated through a color gradation. "File 9" still shows a high level of similarity, as illustrated by the solid black line 618, however in this case there are several other pieces of content which have matching segments among the other files 608 as well, such as file 4 which has two non-contiguous portions 620 that have high degrees of similarity, and file 14 622 which has a single contiguous portion but has a lower level of similarity (indicated by the lighter grey). Again, the user can use this information to determine if the content under evaluation contains prohibited content.

Figure 6C:
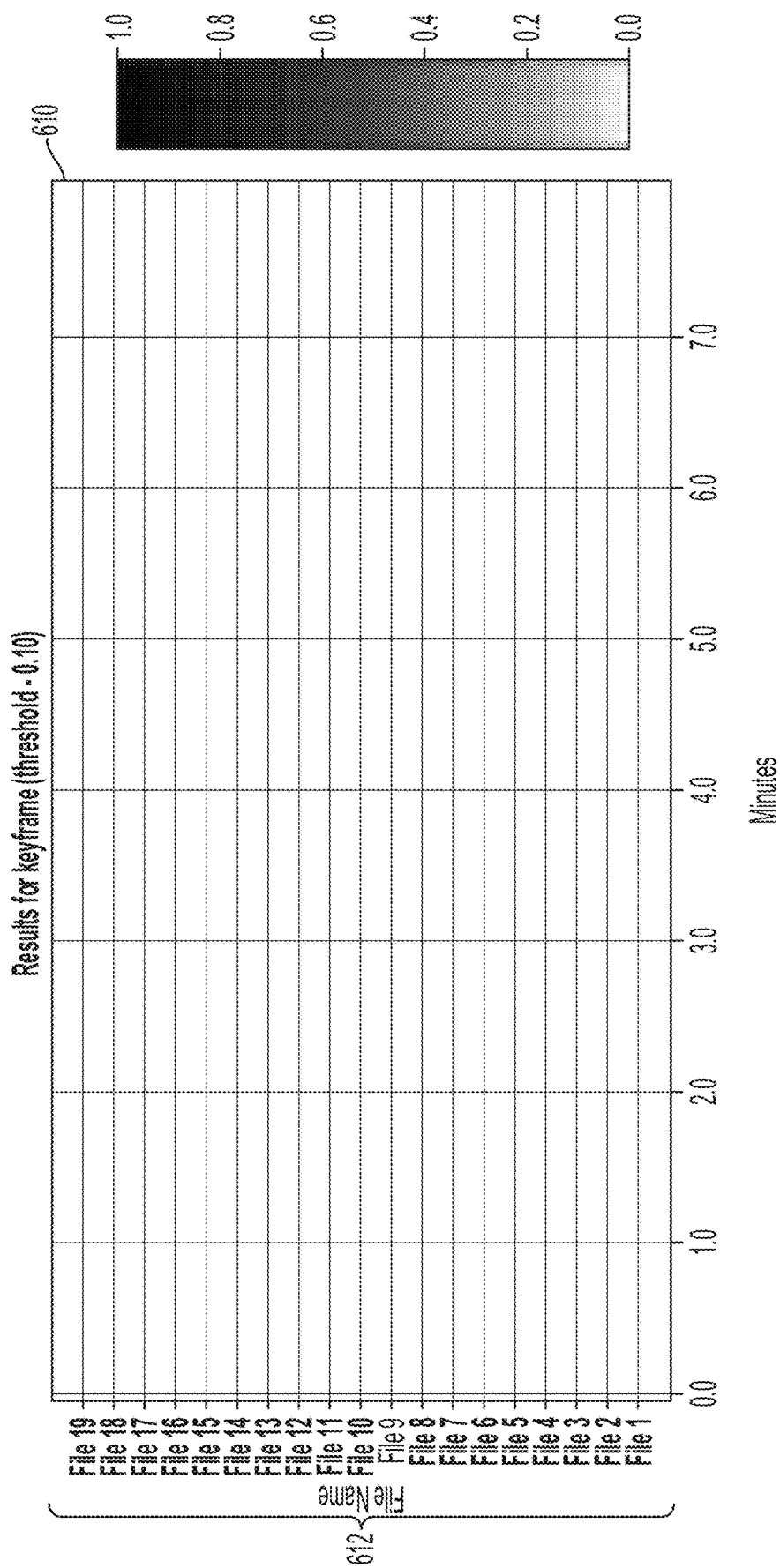
FIG. 6C illustrates an example of keyframe fingerprint comparisons.

FIG. 6C illustrates an example of keyframe fingerprint comparisons 610 for the same content for which the audio comparisons are shown in FIG. 6A and the video comparisons are shown in FIG. 6B. However, as illustrated, the keyframe fingerprint comparison reveals no similarities to any of the files 612 under consideration. Again, the user can use this information to determine if the content under evaluation contains prohibited content.

Figure 7:
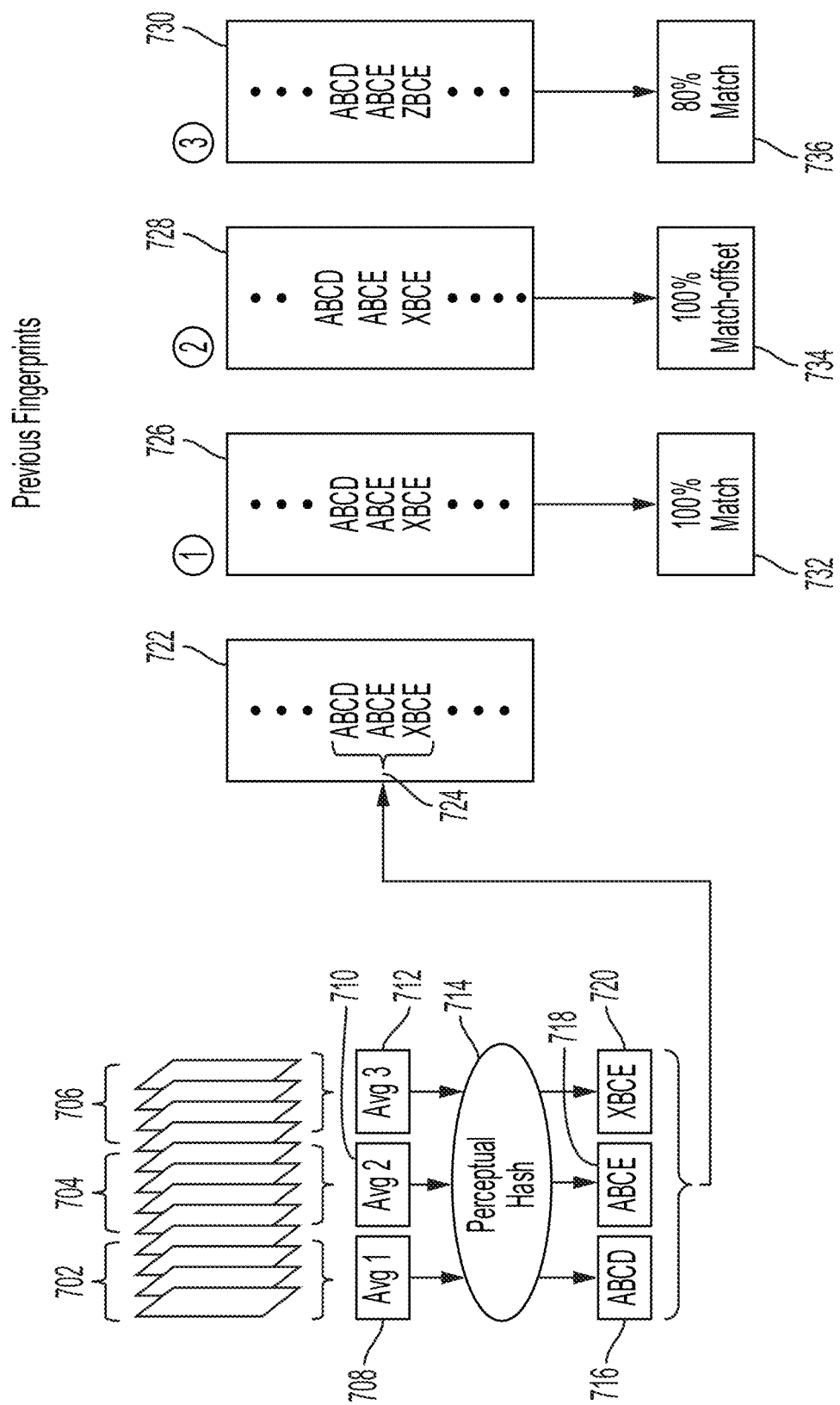
FIG. 7 illustrates an example of fingerprint comparisons.

FIG. 7 illustrates an example of fingerprint comparisons. As illustrated, a portion submitted video content contains frames associated with different segments 702, 704, 706. The system calculates an average for each segment, resulting in Avg 1 708, Avg 2 710, and Avg 3 712. Each of these averaged frames 708, 710, 712 is respectfully submitted to a perceptual hash algorithm 714, resulting in segment fingerprint "ABCD" 716 corresponding to segment 702, segment fingerprint "ABCE" 718 corresponding to segment 704, and segment fingerprint "XBCE" 720 corresponding to segment 706.

The complete fingerprint 722 for the video content is illustrated as a list of the individual segment fingerprints, with "ABCD" immediately followed by "ABCE," which is followed by "XBCE." The system compares the series of segment fingerprints 724 to other, known fingerprints 726, 728, 730. As illustrated, fingerprint (1) 726 has a 100% match 732 for the series of segments, meaning that each segment fingerprint 716, 718, 720 is present within the fingerprint 726, in the same temporal order (in this case, consecutive) as in the submitted video content. Fingerprint (2) 728 also has a 100% match 734, with the same segment fingerprints and same temporal order as the submitted video content. However the match is not at the same temporal point within the video as fingerprint (1) 726, instead the match is earlier within the known content (illustrated by fewer dots preceding the series of segment fingerprints). This could happen, for instance, where a portion of the video has been deleted from the video associated with the second fingerprint 728. Fingerprint (3) 730 has segment fingerprints "ABCD" and "ABCE," however has a slightly different segment fingerprint "ZBCE" as a subsequent segment fingerprint. Accordingly, the system has assigned an 80% match 736 between the submitted video content and this fingerprint 730. The system can provide notifications regarding the matching similarities 732, 734, 736 to a compliance review team and/or can make determinations regarding prohibiting the content based on the similarities detected.

Figure 8:
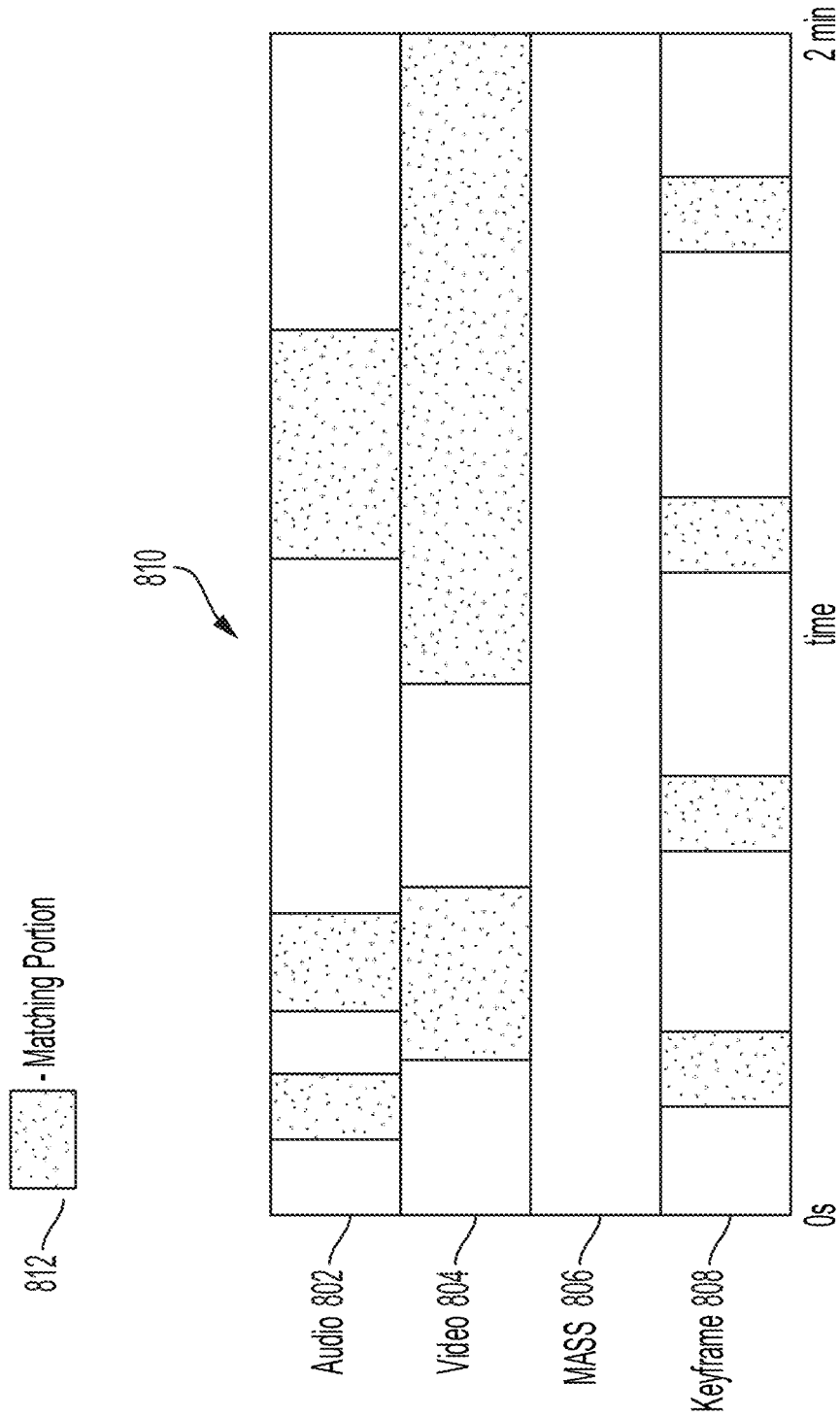
FIG. 8 illustrates a first example user interface showing matching portions.

FIG. 8 illustrates a first example user interface (UI) 810 showing matching portions between uploaded content and known content for different types of fingerprint comparisons. In this example, the user interface 810 has portions associated with the audio fingerprint comparison 802, a video fingerprint comparison 804, a MASS comparison 806, and a keyframe fingerprint comparison 808. As illustrated, there are portions of the audio 802, video 804, and keyframe 808 comparisons which are matching 812 between the uploaded content and the known content. A user reviewing the comparisons 802, 804, 806, 808 via the UI 810 can examine the respective matching sections in determining if the content under evaluation contains prohibited content.

Figure 9A:
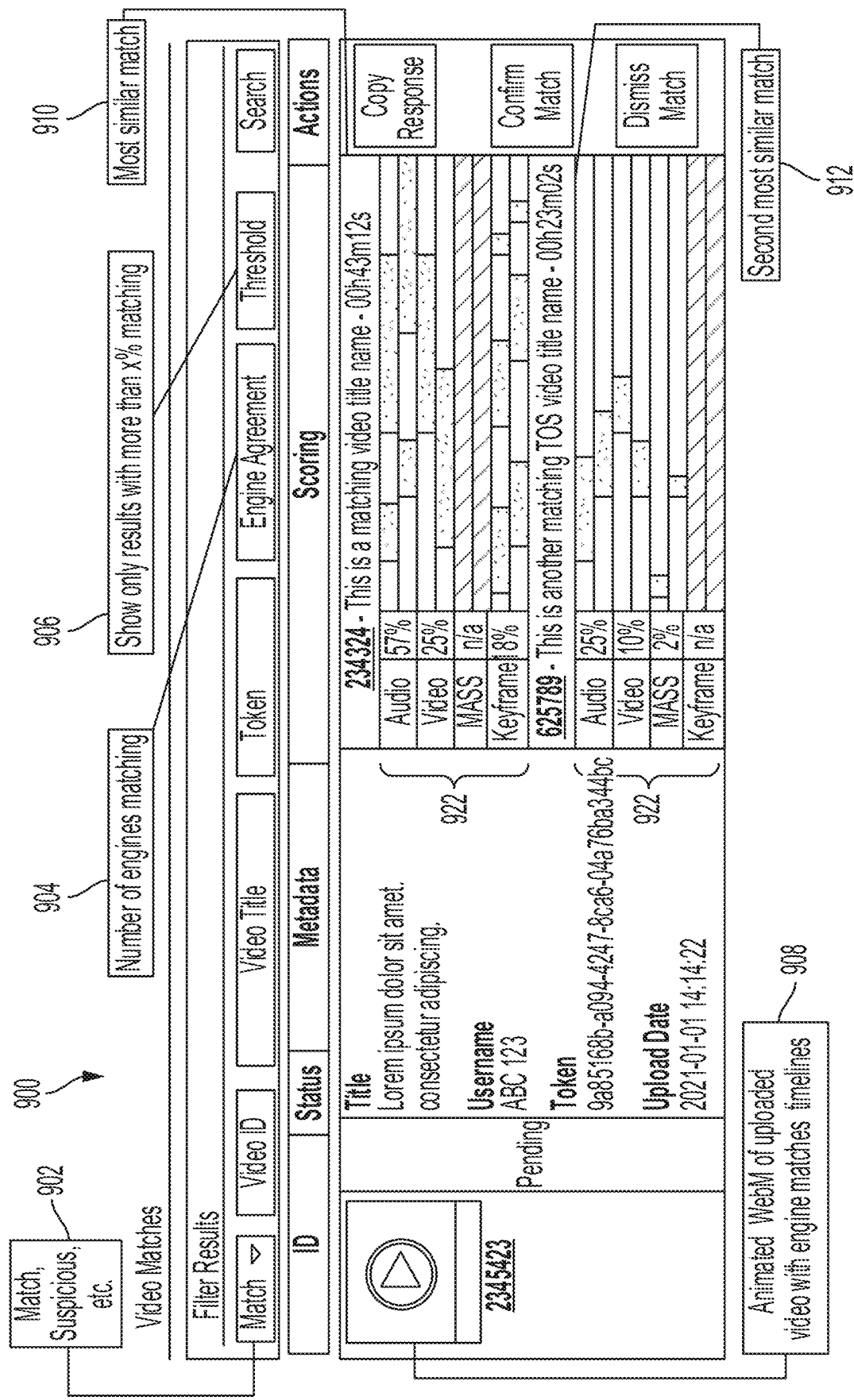
FIG. 9A illustrates a second example user interface showing matching portions.

FIG. 9A illustrates a second example user interface 900 showing matching portions 922. Within this UI, the user can filter between content which is an exact match 902 for the content under examination, content which is suspicious, etc. The user can likewise filter matching content based on the types of engines 904 (for example, only content which matches based on audio fingerprint comparisons, and/or only content which matches based on video fingerprint comparisons), the threshold amount 906, where only results with more than x% matching are shown (where the user can set the threshold x). The UI can rank the compared content, with the most similar match 910 displayed first, a second most similar match 912 displayed second, etc. In the illustrated configuration, the user can have the option to see an animated video comparison 908 of the content being examined and known content. The UI can also display metadata (title, name of the uploading user, identifying tokens, upload date, etc.), and the matching portions/segments of the different comparisons 922. For example, a chart similar to the UI illustrated in FIG. 8 can be included here, providing the user a view of the portions of the content which match the previously known content with respect to audio, video, MASS, keyframe, and/or other comparisons. The UI can also show a percentage amount identifying how much of the known content matches the content under review, and provide the user options such as "Copy Response," "Confirm Match," "Dismiss Match," etc.

Figure 9B:
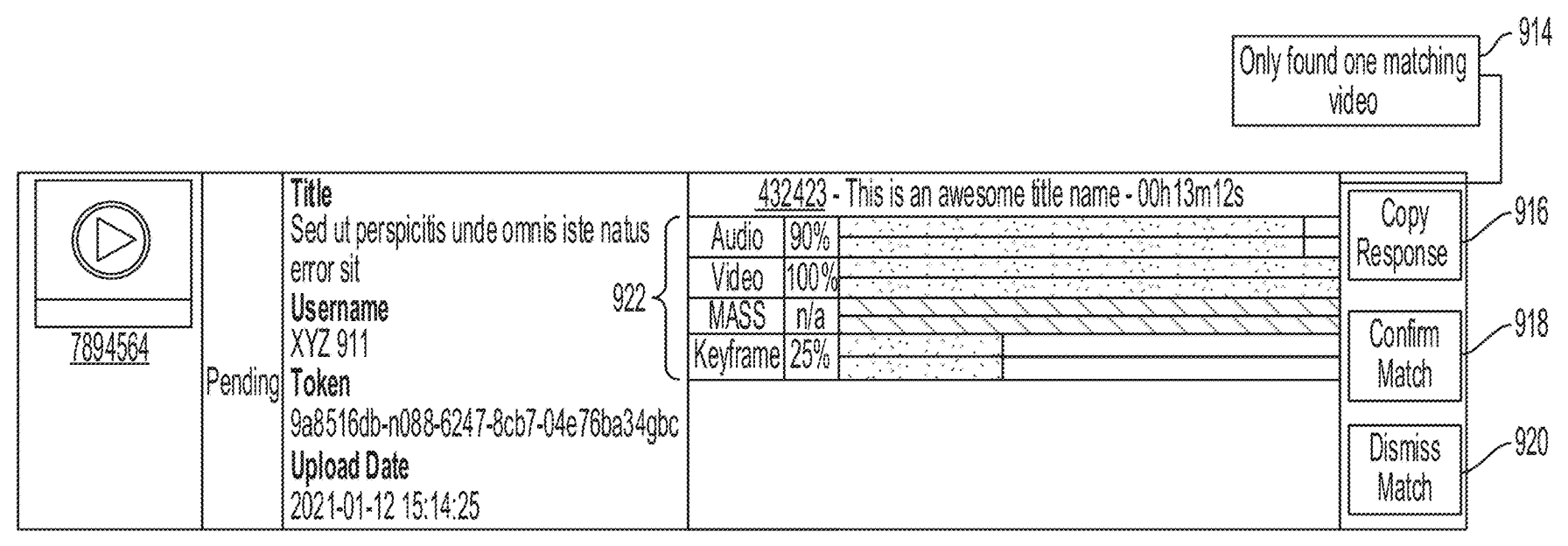

FIG. 9B illustrates a third example user interface showing matching portions. In some configurations, this third example can be a continuation of the second example illustrated in FIG. 9A. Here, the different comparisons 922 are also shown as are the user options such as "Copy Response" 916, "Confirm Match" 918, and "Dismiss Match" 920. However, in this case there is only one matching video 914.

Figure 10:
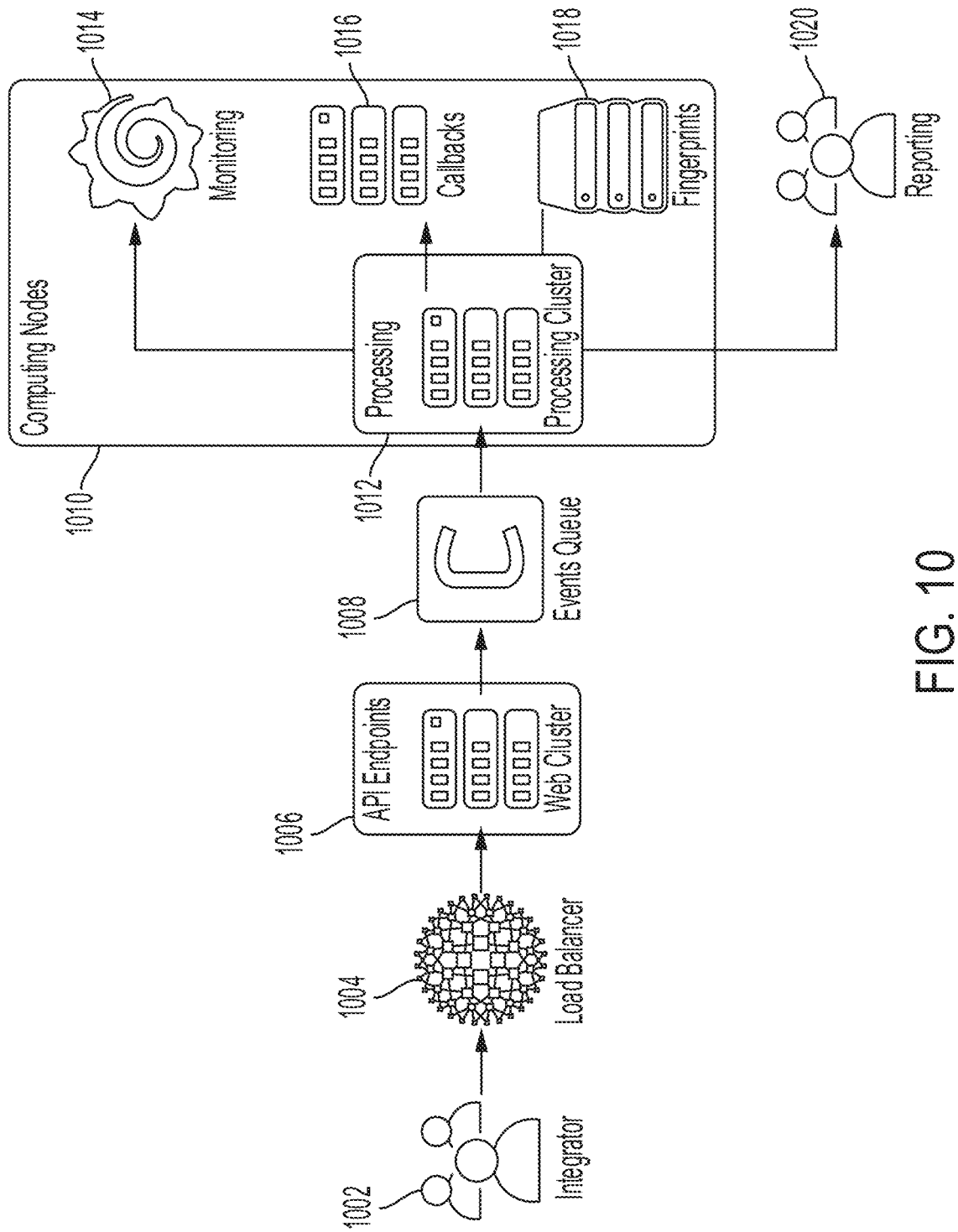
FIG. 10 illustrates an example system architecture.

FIG. 10 illustrates an example system architecture. As illustrated, protection and querying requests are sent by the "Integrator" 1002 (such as any VSP or third-party application) to a "Load Balancer" 1004. The load balancer redirects the requests to a cluster of web servers 1006 that serve as "API Endpoints." These web servers validate the requests and then send through the "Events Queue" 1008 to be distributed to the "Computing Nodes" 1010. The "Processing Cluster" 1012 will then try to match uploaded content using "Fingerprints" 1018 stored in a storage cluster. Once a protection or querying request has completed, the data is sent back to the integrator 1002 using "Callbacks" 1016.

Infrastructure metrics can be continuously monitored 1014 to ensure the system infrastructure remains functional at all time. If the infrastructure metrics diverge and indicate that errors are occurring, alerts can be triggered to notify the appropriate personnel. Reports 1020 on protection requests, querying requests, and system performance can provided at periodic intervals or whenever an event meets a threshold level of immediacy.

All computing and storage resources are highly scalable and can support a large amount of content and fingerprinting activity. All systems can be continuously backed up and can use disaster recovery strategies to avoid any data loss in case of a major infrastructure incident.

Figure 11:
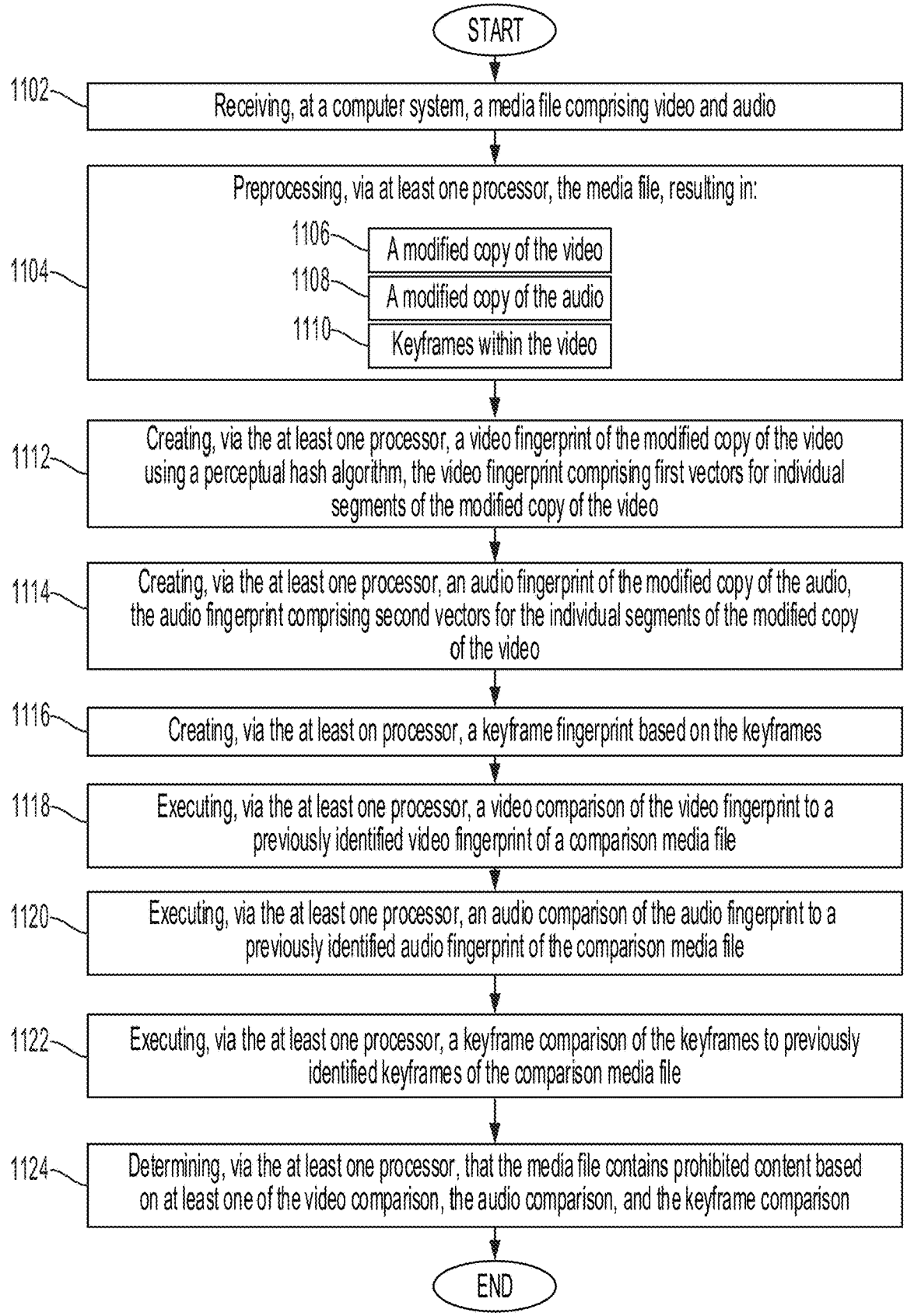
FIG. 11 illustrates an example method embodiment.

FIG. 11 illustrates an example method embodiment which can, for example, be performed by a computer system. As illustrated, the method can include: receiving, at a computer system, a media file comprising video and audio (1102), and preprocessing, via at least one processor, the media file (1104), resulting in: a modified copy of the video (1106); a modified copy of the audio (1108); and keyframes within the video (1110). The system can then create, via the at least one processor, a video fingerprint of the modified copy of the video using a perceptual hash algorithm, the video fingerprint comprising first vectors for individual segments of the modified copy of the video (1112). The system can likewise create, via the at least one processor, an audio fingerprint of the modified copy of the audio, the audio fingerprint comprising second vectors for the individual segments of the modified copy of the video (1114), and create, via the at least one processor, a keyframe fingerprint based on the keyframes (1116).

With the fingerprints created, the system can execute, via the at least one processor, a video comparison of the video fingerprint to a previously identified video fingerprint of a comparison media file (1118), an audio comparison of the audio fingerprint to a previously identified audio fingerprint of the comparison media file (1120), and a keyframe comparison of the keyframes to previously identified keyframes of the comparison media file (1122). The comparison media file can be, for example, another image, movie, or other media content to which the current media file is being compared. Generally, the comparison media file has already been analyzed, such that the fingerprints (audio, video, image, keyframe, etc.) have already been generated and saved. These previously identified audio, video, and keyframe fingerprints can then be used for the respective comparisons to the fingerprints of the media file being analyzed. The system can then determine, via the at least one processor, that the media file contains prohibited content based on at least one of the video comparison, the audio comparison, and the keyframe comparison (1124). Prohibited content can include any content which the owner or uploader of the media file is not legally allowed to share, including copyrighted media, video or images of underage sexual content, video or images which were obtained without consent, etc.

The illustrated method could, in other configurations, be: receiving, at a computer system, a media file comprising video and audio; preprocessing, via at least one processor, the media file, resulting in: a modified copy of the video; a modified copy of the audio; and keyframes within the video; creating, via the at least one processor, a video fingerprint of the modified copy of the video using a perceptual hash algorithm, the video fingerprint comprising first vectors for individual segments of the modified copy of the video; creating, via the at least one processor, an audio fingerprint of the modified copy of the audio, the audio fingerprint comprising second vectors for the individual segments of the modified copy of the video; creating, via the at least one processor, a keyframe fingerprint based on the keyframes; creating, based on the video comparison and via the at least one processor, a second video fingerprint of the modified copy of the video using at least one of MASS (Mueen's Algorithm for Similarity Search) and DTW (Dynamic Time Warping); and executing, via the at least one processor, a video comparison of the video fingerprint to a previously identified video fingerprint of a comparison media file; executing, via at least one processor, an audio comparison of the audio fingerprint to a previously identified audio fingerprint of the comparison media file; executing, via the at least one processor, a keyframe comparison of the keyframes to previously identified keyframes of the comparison media file; executing, via the at least one processor, a second video comparison of the second video fingerprint to a previously identified second video fingerprint of the comparison media file, the previously identified second video fingerprint of the comparison media file having been generated using at least one of MASS and DTW; and determining, via the at least one processor, that the media file contains prohibited content based on at least one of the video comparison, the audio comparison, the keyframe comparison, and the second video comparison.

Another alternative version of the illustrated method could be: receiving, at a computer system, a media file comprising video and audio; creating, via at least one processor of the computer system, a video fingerprint, an audio fingerprint, and a keyframe fingerprint of the media file; executing, via the at least one processor, a video comparison of the video fingerprint previously identified video fingerprints; executing, via the at least one processor, an audio comparison of the audio fingerprint to previously identified audio fingerprints; executing, via the at least one processor, a keyframe comparison of the keyframe fingerprint to previously identified keyframe fingerprints; and determining, via the at least one processor, that the media file contains prohibited content based on at least one of the video comparison, the audio comparison, and the keyframe comparison.

Yet another alternative version of the illustrated method could be: receiving, at a computer system, a media file comprising video and audio; preprocessing, via at least one processor, the media file, resulting in a preprocessed media file having preprocessed video and preprocessed audio; creating, via the at least one processor, a first video fingerprint of the preprocessed video using a perceptual hash algorithm, an audio fingerprint of the preprocessed audio, and a second video fingerprint of the preprocessed video using keyframes within the preprocessed video; comparing the first video fingerprint, the second video fingerprint, and the audio fingerprint to known fingerprints, resulting in a comparison; and determining, via the at least one processor, that the media file contains prohibited content based on the comparison.

In configurations being used for image analysis (or other visual media), the preprocessing, fingerprinting, and comparisons can be adjusted as disclosed above.

In some configurations, the video comparison identifies, within the individual segments, individual video segments which meet a predetermined video threshold level of similarity between the video fingerprint and the previously identified video fingerprint for the comparison media file; the audio comparison identifies, within the individual segments, individual audio segments which meet a predetermined audio threshold level of similarity between the audio fingerprint and the previously identified audio fingerprint for the comparison media file; and the keyframe comparison identifies individual keyframes which meet a predetermined keyframe threshold level of similarity between the keyframes and the previously identified keyframes of the comparison media file.

In some configurations, the preprocessing of the media file can include parallel processes for creating the modified copy of the video, the modified copy of the audio, and identifying the keyframes within the video.

In some configurations, the execution of the video comparison, the audio comparison, and the keyframe comparison occur in parallel.

In some configurations, the preprocessing of the media file resulting in the modified copy of the video can include performing at least one of: modifying, via the at least one processor, a framerate of the video to a predetermined framerate; modifying, via the at least one processor, a resolution of the video to a predetermined resolution; and removing, via the at least one processor, bars from at least one side of the video.

In some configurations, the preprocessing of the media file resulting in the modified copy of the audio can include: transforming, via a Fast Fourier Transform executed by the at least one processor, the audio into the frequency domain, resulting in frequency domain audio; and filtering, via the at least one processor, out of the frequency domain audio at least one of: sound above a first predetermined frequency; sound above a first predetermined decibel; sound below a second predetermined frequency; and sound below a second predetermined decibel.

In some configurations, the preprocessing of the media file resulting in the keyframes within the video can include: identifying, via the at least one processor, a predetermined amount of entropy to exist between keyframes; and identifying, via the at least one processor, a first frame within a segment of video as a keyframe; and repeating through the length of the video: adding, via the at least one processor, the keyframe to the keyframes; comparing, via the at least one processor, sequentially subsequent frames from the keyframe until the predetermined amount of entropy is found between the keyframe and a subsequent frame; and identifying, via the at least one processor, the subsequent frame as the first keyframe, resulting in the keyframes.

In some configurations, the illustrated method can further include: creating, based on the video comparison and via the at least one processor, a second video fingerprint of the modified copy of the video using MASS (Mueen's Algorithm for Similarity Search); and executing, via the at least one processor, a second video comparison of the second video fingerprint to a previously identified second video fingerprint of the comparison media file, the previously identified second video fingerprint of the comparison media file having been generated using MASS, wherein the determining that the media file contains prohibited content is further based on the second video comparison.

In some configurations, the creating of the video fingerprint can further include: detecting, via the at least one processor, a face within the modified video; cropping, via the at least one processor, the face out of the modified video; and creating, via the at least one processor executing the perceptual hash algorithm, a facial fingerprint of the face, wherein the video fingerprint further comprises the facial fingerprint; and the video comparison further comprises: comparing the facial fingerprint with known facial fingerprints; and upon detecting no match within the known facial fingerprints, storing the facial fingerprint within a database storing the known facial fingerprints.

In some configurations, the audio comparison, the video comparison, and the keyframe comparison respectively include: comparisons of consecutive sub-portions of the audio fingerprint, consecutive sub-portions of the video fingerprint, or consecutive sub-portions of the keyframe fingerprint to consecutive sub-portions of the previously identified audio fingerprint of the comparison media file, consecutive sub-portions of the previously identified video fingerprint of the comparison media file, or consecutive sub-portions of the previously identified keyframe fingerprint of the comparison media file.

With reference to FIG. 12, an exemplary system includes a general-purpose computing device 1200, including a processing unit (CPU or processor) 1220 and a system bus 1210 that couples various system components including the system memory 1230 such as read-only memory (ROM) 1240 and random access memory (RAM) 1250 to the processor 1220. The system 1200 can include a cache of high-speed memory connected directly with, in close proximity to, or integrated as part of the processor 1220. The system 1200 copies data from the memory 1230 and/or the storage device 1260 to the cache for quick access by the processor 1220. In this way, the cache provides a performance boost that avoids processor 1220 delays while waiting for data. These and other modules can control or be configured to control the processor 1220 to perform various actions. Other system memory 1230 may be available for use as well. The memory 1230 can include multiple different types of memory with different performance characteristics. It can be appreciated that the disclosure may operate on a computing device 1200 with more than one processor 1220 or on a group or cluster of computing devices networked together to provide greater processing capability. The processor 1220 can include any general purpose processor and a hardware module or software module, such as module 1 1262, module 2 1264, and module 3 1266 stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output (BIOS) stored in ROM 1240 or the like, may provide the basic routine that helps to transfer information between elements within the computing device 1200, such as during start-up. The computing device 1200 further includes storage devices 1260 such as a hard disk drive, a magnetic disk drive, an optical disk drive, tape drive or the like. The storage device 1260 can include software modules 1262, 1264, 1266 for controlling the processor 1220. Other hardware or software modules are contemplated. The storage device 1260 is connected to the system bus 1210 by a drive interface. The drives and the associated computer-readable storage media provide non-volatile storage of computer-readable instructions, data structures, program modules and other data for the computing device 1200. In one aspect, a hardware module that performs a particular function includes the software component stored in a tangible computer-readable storage medium in connection with the necessary hardware components, such as the processor 1220, bus 1210, display 1270, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1200 is a small, handheld computing device, a desktop computer, or a computer server.

Although the exemplary embodiment described herein employs the hard disk 1260, other types of computer-readable media which can store data that are accessible by a computer, such as magnetic cassettes, flash memory cards, digital versatile disks, cartridges, random access memories (RAMs) 1250, and read-only memory (ROM) 1240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1200, an input device 1290 represents any number of input mechanisms, such as a microphone for speech, a touch-sensitive screen for gesture or graphical input, keyboard, mouse, motion input, speech and so forth. An output device 1270 can also be one or more of a number of output mechanisms known to those of skill in the art. In some instances, multimodal systems enable a user to provide multiple types of input to communicate with the computing device 1200. The communications interface 1280 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving, at a computer system, a media file comprising video content;
converting, via at least one processor of the computer system, the video content to greyscale, resulting in greyscaled video content;
segmenting, via the at least one processor of the computer system, the greyscaled video content using a rolling window of predetermined length, resulting in a downsampled plurality of processed segments;
calculating, via the at least one processor for each segment within the plurality of downsampled processed segments, an average of pixel values, resulting in an average grey pixel value for each frame;
hashing, via the at least one processor, the average grey pixel value for each segment within the plurality of downsampled processed segments, resulting in a plurality of hashed segment pixel values; and
generating, via the at least one processor by combining at least two hashed segment pixel values from the plurality of hashed segment pixel values, a fingerprint of at least a portion of the media file.

2. The method of claim 1, wherein the rolling window causes each segment to have an amount of overlap with a previous segment and a subsequent segment.

3. The method of claim 1, wherein segments of the media file corresponding to the at least two hashed segment pixel values are consecutive within the media file.

4. The method of claim 1, further comprising:
comparing, via the at least one processor, the fingerprint against at least one known fingerprint, resulting in at least one percentage of similarity.

5. The method of claim 4, further comprising:
determining, via the at least one processor, that the media file comprises prohibited content based on the at least one percentage of similarity.

6. The method of claim 4, further comprising:
sending, via the at least one processor, the media file and the at least one percentage of similarity to a compliance review team to determine if the media file comprises prohibited content.

7. The method of claim 4, wherein the comparing of the fingerprint against the at least one known fingerprint identifies a distinction within a temporal order of the media file and at least one piece of known content.

8. A system comprising:
at least one processor; and
a non-transitory computer-readable storage medium having instructions stored which, when executed by the at least one processor, cause the at least one processor to perform operations comprising:
receiving a media file comprising video content;
converting the video content to greyscale, resulting in greyscaled video content;
segmenting the greyscaled video content using a rolling window of predetermined length, resulting in a downsampled plurality of processed segments;
calculating, for each segment within the plurality of downsampled processed segments, an average of pixel values, resulting in an average grey pixel value for each frame;
hashing the average grey pixel value for each segment within the plurality of downsampled processed segments, resulting in a plurality of hashed segment pixel values; and
generating, by combining at least two hashed segment pixel values from the plurality of hashed segment pixel values, a fingerprint of at least a portion of the media file.

9. The system of claim 8, wherein the rolling window causes each segment to have an amount of overlap with a previous segment and a subsequent segment.

10. The system of claim 8, wherein segments of the media file corresponding to the at least two hashed segment pixel values are consecutive within the media file.

11. The system of claim 8, the non-transitory computer-readable storage medium having additional instructions stored which, when executed by the at least one processor, cause the at least one processor to perform operations comprising:
comparing the fingerprint against at least one known fingerprint, resulting in at least one percentage of similarity.

12. The system of claim 11, the non-transitory computer-readable storage medium having additional instructions stored which, when executed by the at least one processor, cause the at least one processor to perform operations comprising:
determining that the media file comprises prohibited content based on the at least one percentage of similarity.

13. The system of claim 11, the non-transitory computer-readable storage medium having additional instructions stored which, when executed by the at least one processor, cause the processor to perform operations comprising:
sending the media file and the at least one percentage of similarity to a compliance review team to determine if the media file comprises prohibited content.

14. The system of claim 11, wherein the comparing of the fingerprint against the at least one known fingerprint identifies a distinction within a temporal order of the media file and at least one piece of known content.

15. A non-transitory computer-readable storage medium having instructions stored which, when executed by at least one processor, cause the at least one processor to perform operations comprising:
receiving a media file comprising video content;
converting the video content to greyscale, resulting in greyscaled video content;
segmenting the greyscaled video content using a rolling window of predetermined length, resulting in a downsampled plurality of processed segments;
calculating, for each segment within the plurality of downsampled processed segments, an average of pixel values, resulting in an average grey pixel value for each frame;
hashing the average grey pixel value for each segment within the plurality of downsampled processed segments, resulting in a plurality of hashed segment pixel values; and
generating, by combining at least two hashed segment pixel values from the plurality of hashed segment pixel values, a fingerprint of at least a portion of the media file.

16. The non-transitory computer-readable storage medium of claim 15, wherein the rolling window causes each segment to have an amount of overlap with a previous segment and a subsequent segment.

17. The non-transitory computer-readable storage medium of claim 15, wherein segments of the media file corresponding to the at least two hashed segment pixel values are consecutive within the media file.

18. The non-transitory computer-readable storage medium of claim 15, having additional instructions stored which, when executed by the at least one processor, cause the at least one processor to perform operations comprising:
    comparing the fingerprint against at least one known fingerprint, resulting in at least one percentage of similarity.

19. The non-transitory computer-readable storage medium of claim 18, having additional instructions stored which, when executed by the at least one processor, cause the at least one processor to perform operations comprising:
    determining that the media file comprises prohibited content based on the at least one percentage of similarity.

20. The non-transitory computer-readable storage medium of claim 18, having additional instructions stored which, when executed by the at least one processor, cause the at least one processor to perform operations comprising:
    sending the media file and the at least one percentage of similarity to a compliance review team to determine if the media file comprises prohibited content.

\* \* \* \* \*